(12) United States Patent
Wang

(10) Patent No.: US 10,229,534 B2
(45) Date of Patent: Mar. 12, 2019

(54) MODELING OF A USER'S FACE

(71) Applicant: Ditto Technologies, Inc., San Francisco, CA (US)

(72) Inventor: Michael Wang, Saratoga, CA (US)

(73) Assignee: Ditto Technologies, Inc., Oakland, CA (US)

( * ) Notice: Subject to any disclaimer, the term of this patent is extended or adjusted under 35 U.S.C. 154(b) by 41 days.

(21) Appl. No.: 15/441,760

(22) Filed: Feb. 24, 2017

(65) Prior Publication Data

US 2018/0197330 A1 Jul. 12, 2018

Related U.S. Application Data

(60) Provisional application No. 62/444,754, filed on Jan. 10, 2017.

(51) Int. Cl.

| | |
|---|---|
| *G06T 17/10* | (2006.01) |
| *G06T 15/04* | (2011.01) |
| *G06K 9/00* | (2006.01) |
| *G06T 11/00* | (2006.01) |
| *G06T 7/269* | (2017.01) |
| *G06K 9/20* | (2006.01) |
| *G06T 7/80* | (2017.01) |
| *G06T 7/571* | (2017.01) |

(52) U.S. Cl.
CPC .......... *G06T 17/10* (2013.01); *G06K 9/00228* (2013.01); *G06T 11/00* (2013.01); *G06T 15/04* (2013.01); *G06K 9/209* (2013.01); *G06T 7/269* (2017.01); *G06T 7/571* (2017.01); *G06T 7/80* (2017.01); *G06T 2215/16* (2013.01)

(58) Field of Classification Search
CPC ..... G06T 2215/16; G06T 9/001; G06T 11/00; G06T 7/269; G06T 7/223; G06T 7/571; G06T 7/80; G06T 7/20; G06T 2207/10016; G06K 9/209; G06K 2209/40
See application file for complete search history.

(56) References Cited

U.S. PATENT DOCUMENTS

| | | | | |
|---|---|---|---|---|
| 5,774,129 | A * | 6/1998 | Poggio | G06T 9/001 |
| | | | | 345/441 |
| 2006/0228002 | A1* | 10/2006 | Zitnick, III | G06K 9/34 |
| | | | | 382/107 |
| 2014/0362091 | A1* | 12/2014 | Bouaziz | G06T 13/40 |
| | | | | 345/473 |
| 2016/0171667 | A1* | 6/2016 | Tezaur | G06T 5/003 |
| | | | | 382/275 |
| 2017/0061623 | A1* | 3/2017 | Jaehnisch | G06T 7/20 |
| 2017/0161565 | A1* | 6/2017 | Garud | G06K 9/00791 |

(Continued)

OTHER PUBLICATIONS

Aldrian et al., A Linear Approach of 3D Face Shape and Texture Recovery using a 3D Morphable Model, BMCV, 2010.

(Continued)

*Primary Examiner* — Saptarshi Mazumder
(74) *Attorney, Agent, or Firm* — Van Pelt, Yi & James LLP

(57) ABSTRACT

Modeling of a user's face is disclosed, including: receiving an input image of a user's face to be modeled; and generating a set of parameter values to a statistical model that corresponds to the input image by evaluating candidate parameter values using a cost function that is determined based at least in part on optical flow.

16 Claims, 18 Drawing Sheets

(56) References Cited

U.S. PATENT DOCUMENTS

2017/0169620 A1* 6/2017 Bleiweiss ............... G06F 17/50
2017/0364733 A1* 12/2017 Estrada .................... G06N 3/04

OTHER PUBLICATIONS

Author Unknown, Gauss-Newton Algorithm, Wikipedia, Nov. 13, 2016, https://web.archive.org/web/20161113233445/https://en.wikipedia.org/wiki/Gauss%E2%80%93Newton_algorithm.
Author Unknown, Levenberg—Marquardt Algorithm, Wikipedia, Dec. 31, 2016, https://web.archive.org/web/20161231063825/https://en.wikipedia.org/wiki/Levenberg%E2%80%93Marquardt_algorithm.
Bas et al., Fitting a 3D Morphable Model to Edges: A Comparison Between Hard and Soft Correspondences, HAL, Nov. 2016.
Blanz et al., A Morphable Model for the Synthesis of 3D Faces, Proceedings of the 26th annual conference on Computer graphics and interactive techniques, 1999, 187-194, ACM Press/Addison-Wesley Publishing Co.
Blanz et al., Face Recognition Based on Fitting a 3D Morphable Model, IEEE Transactions on Pattern Analysis and Machine Intelligence, Sep. 2003, 1063-1074, 25-9.
Blanz et al., Fitting a Morphable Model to 3D Scans of Faces, 2007.
Booth et al., A 3D Morphable Model learnt from 10,000 faces, 2016.
Booth et al., Optimal UV Spaces for Facial Morphable Model Construction, 2014.
Cao et al., Real-Time High-Fidelity Facial Performance Capture, 2015.
Cootes et al., Active Appearance Models, Proc. European Conference on Computer Vision, 1998, 484-498, 2.
Hsieh et al., Unconstrained Realtime Facial Performance Capture, CVPR, 2015.
Paysan et al., A 3D Face Model for Pose and Illumination Invariant Face Recognition, Advanced video and signal based surveillance, 2009. AVSS'09. Sixth IEEE International Conference, 2009, 296-301.
Romdhani et al., Estimating 3D Shape and Texture Using Pixel Intensity, Edges, Specular Highlights, Texture Constraints and a Prior, 2005 IEEE Computer Society Conference on Computer Vision and Pattern Recognition (CVPR'05), 2005, 986-993, 2.
Suwajanakorn et al., Total Moving Face Reconstruction, 2014.
Thies et al., Face2Face: Real-time Face Capture and Reenactment of RGB Videos, 2016.
Wood et al., A 3D Morphable Eye Region Model for Gaze Estimation, European Conference on Computer Vision, Aug. 2016, 297-313.
Xiao et al., Real-Time Combined 2D+3D Active Appearance Models, 2004.
Xiong et al., Supervised Descent Method and its Applications to Face Alignment, 2013.
Zhu et al., Discriminative 3D Morphable Model Fitting, 2015.
Romdhani et al., "Face Identification by Fitting a 3D Morphable Model using Linear Shape and Texture Error Functions", University of Freiburg, Institut für Informatik, 2002.

* cited by examiner

- Synthetic Pixel at Synthetic Landmark $(x_{syn}, y_{syn})$ with Synthetic Color $(r_{syn}, g_{syn}, b_{syn})$
- Corresponding Pixel at Target Landmark $(x_{input}, y_{input})$ with Target Color $(r_{input}, g_{input}, b_{input})$ Input Image 1st Optical Flow 1st Candidate Synthetic Image (Average Face)

3rd Optical Flow

3rd Candidate Synthetic Image

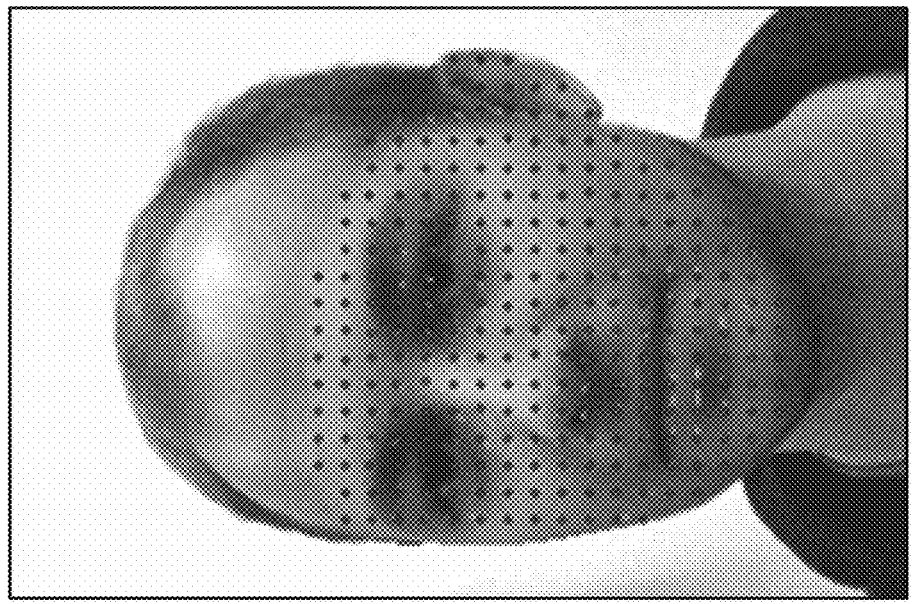
FIG. 13I  4th Optical Flow
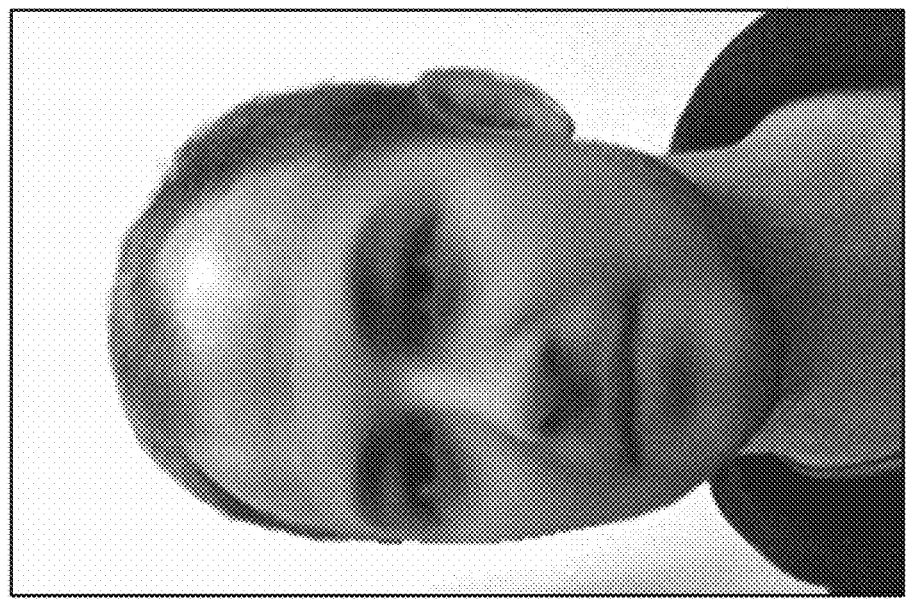
FIG. 13H  4th Candidate Synthetic Image

MODELING OF A USER'S FACE

CROSS REFERENCE TO OTHER APPLICATIONS

This application claims priority to U.S. Provisional Patent Application No. 62/444,754 entitled MODELING OF A USER'S FACE filed Jan. 10, 2017 which is incorporated herein by reference for all purposes.

BACKGROUND OF THE INVENTION

A three-dimensional (3D) morphable model of a user's face may be generated to enable virtual augmentation of the user's face. For example, the 3D model of the user's face may be used to virtually try on various facial accessories, such as glasses and jewelry, to save the user a physical trip to a retail store. It would be desirable to efficiently generate a 3D morphable model of a user's face that closely fits the user's actual face.

BRIEF DESCRIPTION OF THE DRAWINGS

Various embodiments of the invention are disclosed in the following detailed description and the accompanying drawings.

DETAILED DESCRIPTION

Figure 1:
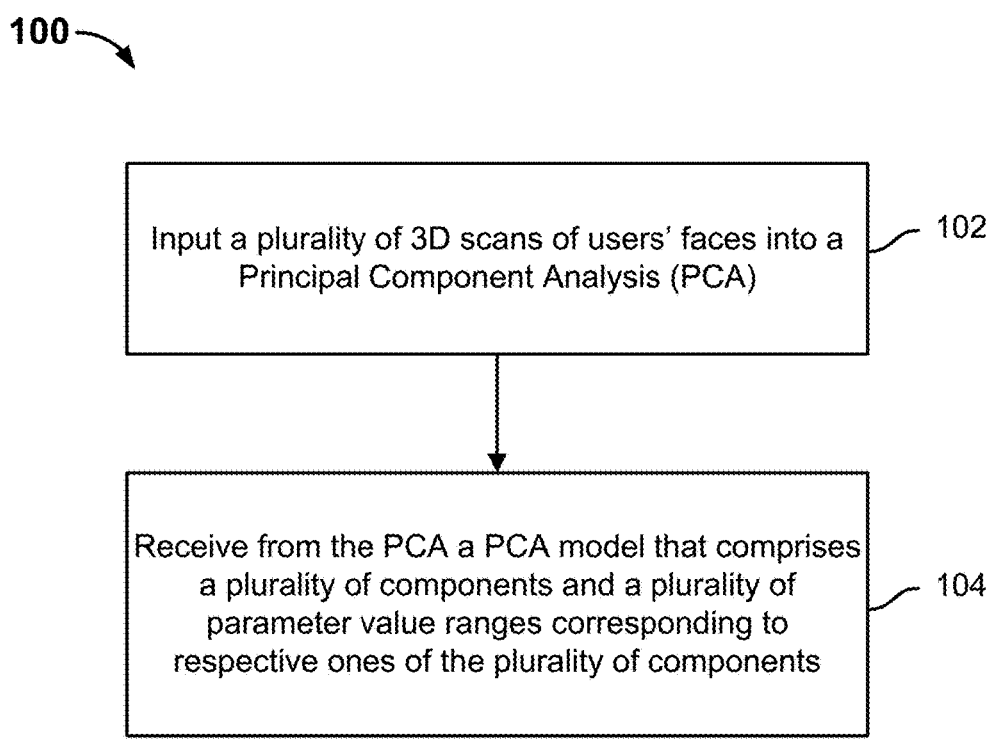
FIG. 1 is a flow diagram showing an example process for determining a PCA model.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of three-dimensional (3D) modeling of a user's face are described herein. In various embodiments, an input image of a user's face to be modeled is received. In various embodiments, a set of parameter values to input into a statistical model to correspond to an input image is generated by evaluating candidate parameter values using a cost function that is determined based at least in part on optical flow. In various embodiments, the statistical model comprises a Principal Component Analysis (PCA) model. In some embodiments, the PCA model is parametrized by a set of shape components (e.g., vectors) and a set of texture components (e.g., vectors). In various embodiments, the set of parameter values to be determined includes coefficient values corresponding to the shape components and the texture components of the PCA model. In some embodiments, the set of parameter values to be determined additionally includes a set of camera parameter values. As will be described in further detail below, the set of parameter values is to be determined with the use of optical flow such that a synthetic image of a user's face that is generated by inputting at least some of the set of parameter values into the PCA model to obtain a 3D model of a face and projecting the obtained 3D model of the user onto a two-dimensional (2D) surface of the focal plane of a camera with the set of camera parameters corresponds to/matches (e.g., within a given tolerance) the input image of the user's face.

FIG. 1 is a flow diagram showing an example process for determining a PCA model.

Process 100 describes an example technique by which a PCA model that is usable to describe a shape and texture (e.g., color) vertices of a 3D model of a user's face is generated.

At 102, a plurality of 3D scans of users' faces is input into a Principal Component Analysis (PCA). PCA is applied to a large number (e.g., 200) of 3D scans of various users' faces.

At 104, a PCA model that comprises a plurality of components and a plurality of parameter value ranges corresponding to respective ones of the plurality of components is received from the PCA. PCA is a statistical procedure that identifies a set of linearly uncorrelated variables, referred to as "principal components," among input data. Each principal component represents a variance among the input data and is orthogonal to each of the other principal components that are determined from the same input data. In various embodiments, the obtained PCA model comprises a set of shape components and a set of texture components that respectively describe variances in the shape and texture among the input 3D scans of users' faces. The combination of the shape and texture components forms a 3D morphable model of a face. In some embodiments, each shape component is a vector of 40,000 (x, y, z) coordinates that describe 40,000 vertices of a 3D model of a user's face. In some embodiments, each texture component is a vector of 40,000 (r, g, b) values that describe the color of 40,000 corresponding vertices of a 3D model of a user's face. In addition to the set of shape components and the set of texture components, the PCA also outputs a range of values corresponding to each coefficient associated with each shape or texture component. One set of the shape and texture coefficients generates a specific face using the 3D morphable model while a second set of the shape and texture coefficients generates another specific face, which is why the model is referred to as being "morphable."

In various embodiments, a different 3D model of a face may be generated by assigning different values to the coefficients associated with each shape or texture component, combining the scaled shape components into a combined face shape, combining the scaled texture components into a combined face texture, and then combining the combined face shape with the combined face texture. The shape coefficients and texture coefficients corresponding to the shape and texture components of a PCA are included in the set of parameter values to be determined in various embodiments as described herein. In some embodiments, the PCA model is configured to include 20 shape components and 20 texture components. As such, 20 shape coefficients and 20 texture coefficients are included in the set of parameter values to be determined in some embodiments described herein.

Figure 2:
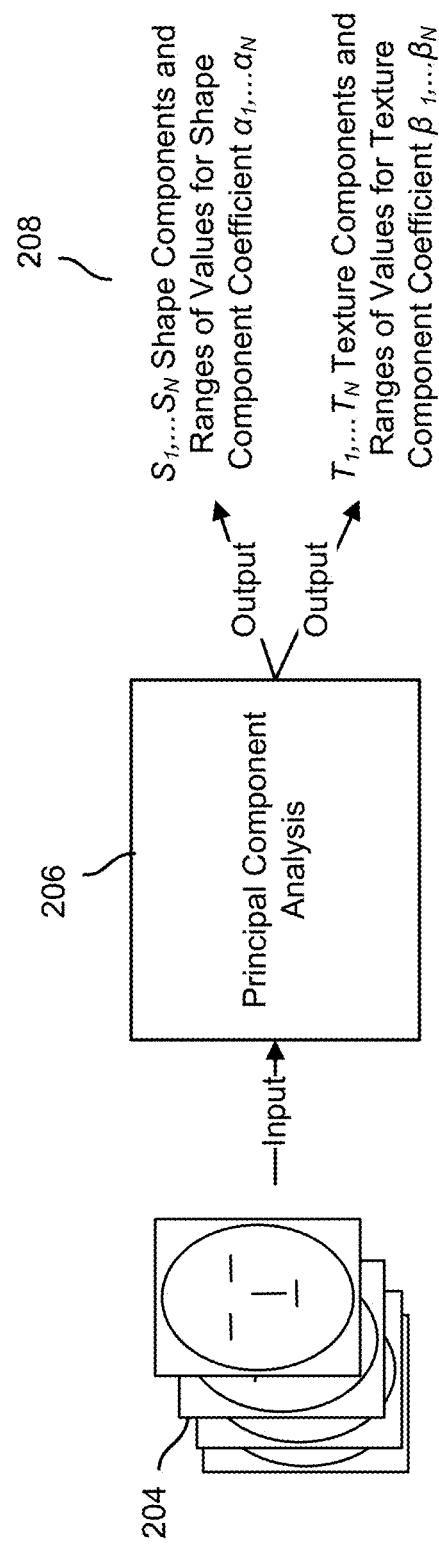
FIG. 2 is a diagram showing an example of the input into and output from a Principal Component Analysis for generating a 3D morphable model of a user's face.

FIG. 2 is a diagram showing an example of the input into and output from a Principal Component Analysis for generating a 3D morphable model of a user's face. As described in process 100 of FIG. 1, various 3D scans of different users' faces 204 are input to Principal Component Analysis 206, which may be implemented using one or more software and hardware. Principal Component Analysis 206 then produces outputs 208. Outputs 208 includes a set of shape components $S_1, \ldots, S_N$, where $S_i = \ldots, (x_1, y_1, z_1, \ldots, x_n, y_n, z_n)$, where x, y, and z are the 3D locations of a vertex. Outputs 208 further includes a set of texture components $T_1, \ldots, T_N$, where $T_i = (r_1, g_1, b_1, \ldots, r_n, g_n, b_n)$, where collectively r, g, and b is the color of a vertex. In some embodiments, N and n are both values that are configurable. In some embodiments, N=20 and n=40,000. Outputs 208 further includes a range of values for each shape coefficient, $\alpha_1, \ldots, \alpha_N$, corresponding to a respective shape component and a range of values for each texture coefficient, $\beta_1, \ldots, \beta_N$, corresponding to a respective texture component.

In some embodiments, an average shape, $S_{avg}$, (e.g., a vector with 3D coordinates that describe the 3D locations of 40,000 vertices) is generated from various 3D scans of different users' faces 204 separately from Principal Component Analysis 206. In some embodiments, an average texture, $T_{avg}$, (e.g., a vector with r, g, and b values that describe the color of 40,000 vertices) is generated from various 3D scans of different users' faces 204 separately from Principal Component Analysis 206.

In various embodiments, combining the shape and texture components of outputs 208 with the average shape component and the average texture component, a new 3D face shape and a new 3D face texture may be generated based on the following formulae:

$$S_{new} = S_{avg} + \Sigma_i \alpha_i S_i \qquad (1)$$

$$T_{new} = T_{avg} + \Sigma_i \beta_i T_i \qquad (2)$$

where $S_{new}$ represents a new 3D face shape, $S_{avg}$ represents the average shape, $\alpha_i$ represents a shape coefficient corresponding to $S_i$, $S_i$ represents a PCA shape component, $T_{new}$ represents a new 3D face texture, $T_{avg}$ represents the average texture, $\beta_i$ represents a texture coefficient corresponding to $T_i$, and $T_i$ represents a PCA texture component.

$S_{new}$ and $T_{new}$ may then be combined into one mesh to generate a new 3D model of a face. For example, $S_{new}$ and $T_{new}$ may then be combined by assigning each vertex of $S_{new}$ a color of $T_{new}$ that corresponds to the same vertex.

In some embodiments, shape coefficients, $\alpha_1, \ldots, \alpha_{N=20}$, and texture coefficients, $\beta_1, \ldots, \beta_{N=20}$, of the PCA model are included in the set of parameter values that are to be determined.

Figure 3:
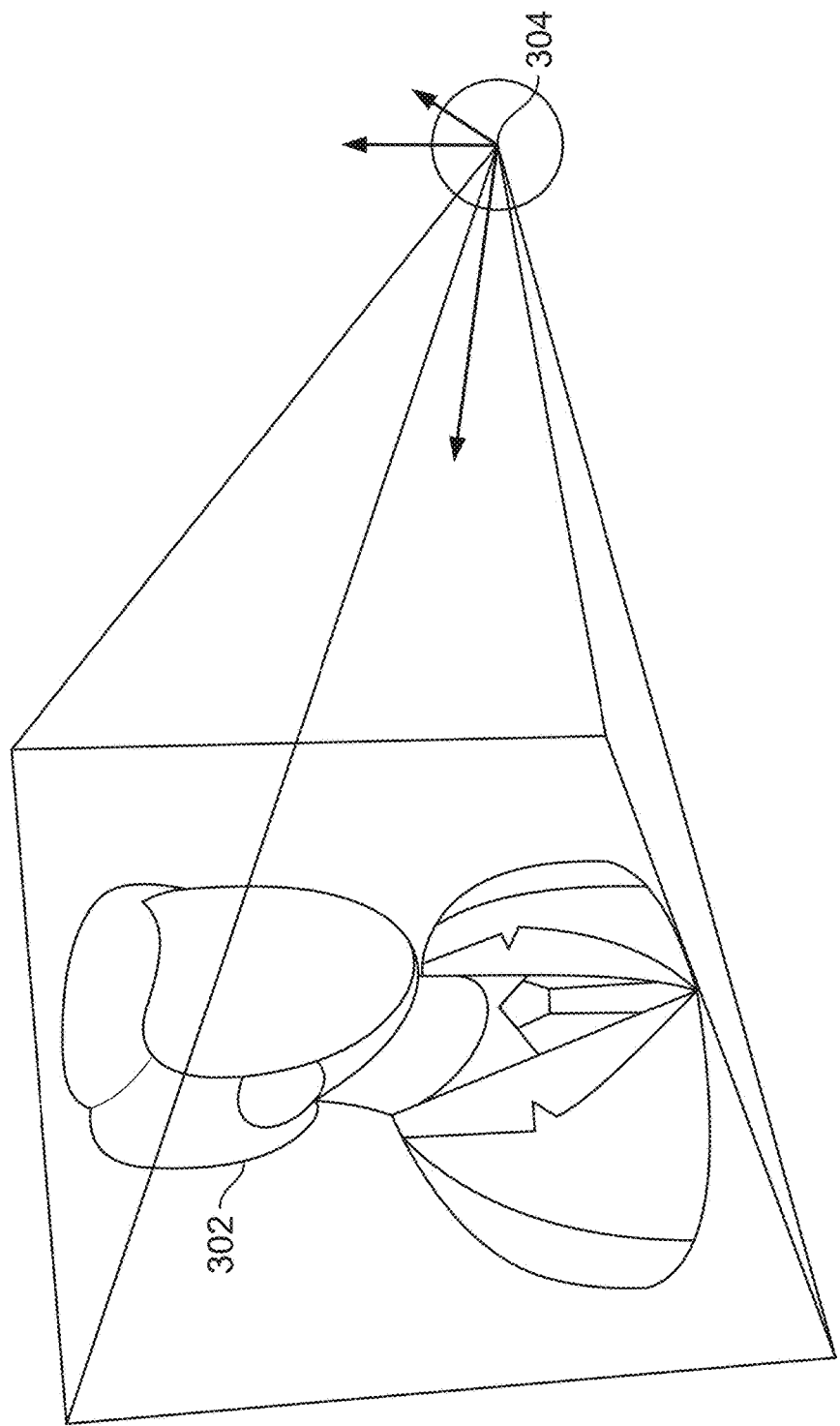
FIG. 3 is a diagram showing a camera that is associated with capturing an input image of a user's face.

FIG. 3 is a diagram showing a camera that is associated with capturing an input image of a user's face. In the example of FIG. 3, a set of camera parameters that characterizes the manner in which camera 304 captures the input image of user's face 302 is included in the set of parameter values to be determined, in various embodiments. As will be described in further detail below, a set of parameter values that can be used to generate a synthetic image that corresponds/matches the input image (e.g., within a given tolerance) is to be determined. In some embodiments, the set of camera parameters comprises camera focal length, rotation (in 3D space), and translation (in 3D space) and may be represented as the seven parameters of $(f, o_x, o_y, o_z, t_x, t_y, t_z)$.

As such, in some embodiments, a set of parameter values to be determined for generating a 3D model of a face to match an input of the user's face includes 20 shape coefficients $\alpha_i, \ldots, \alpha_{N=20}$, 20 texture coefficients, $\beta_i, \ldots, \beta_{N=20}$, and seven camera parameters $(f, o_x, o_y, o_z, t_x, t_y, t_z)$. In other embodiments, additional or alternative parameters, such as those pertaining to lighting and shadows are also to be determined for generating a 3D model of a face.

In some embodiments, parameter values may be determined for the same user's face that is shown in multiple input images. For example, the multiple input images may show the user's face at various different orientations or angles relative to the camera. In the event that parameter values are determined to correspond to mutliple input images at a time, then the parameter values for all input images are solved simultaneously and not in any particular order. Among the multiple input images of one user's face, in some embodiments, the six camera parameters related to rotation and translation $(o_x, o_y, o_z, t_x, t_y, t_z)$ are image specific, while the seventh camera parameter related to focal length (f) is shared across the multiple images and the 40 shape and texture parameters $(\alpha_1, \ldots, \alpha_{N=20}$ and $\beta_1, \ldots, \beta_{N=20})$ are shared across the multiple images as well. Each additional input image contributes more information to improve the shared parameters.

Figure 4:
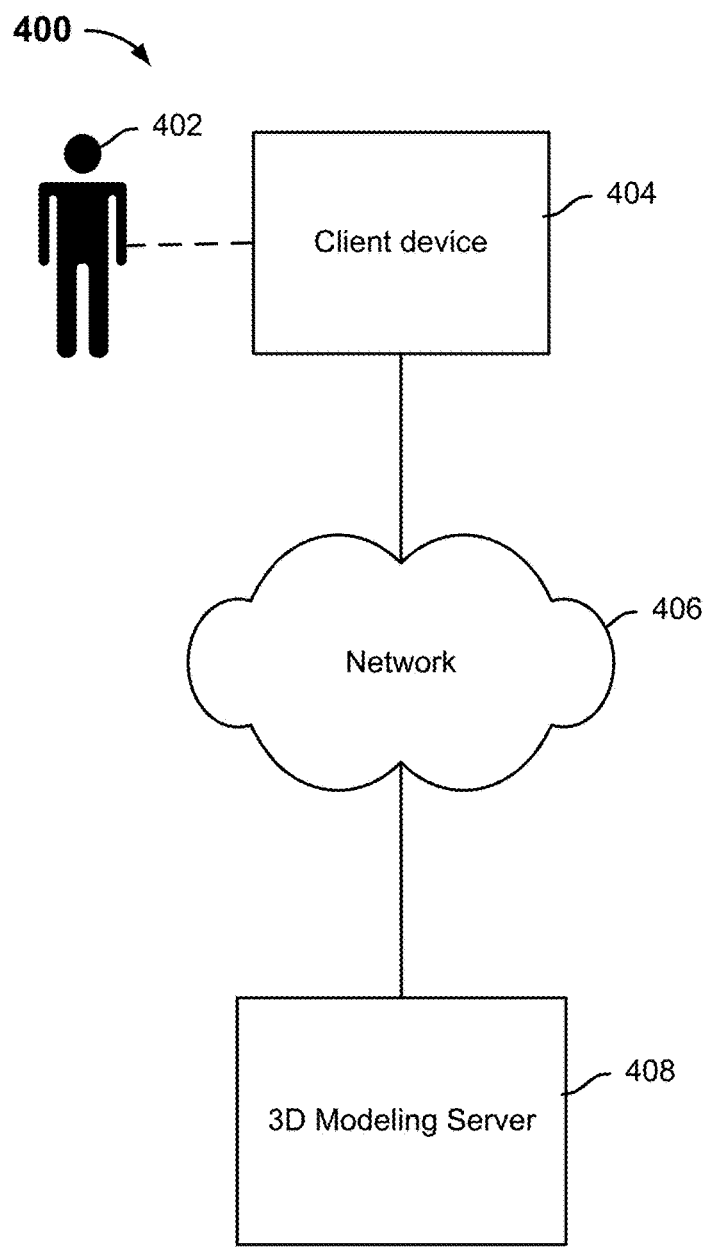
FIG. 4 is a diagram showing an embodiment of a system for 3D modeling of a user's face.

FIG. 4 is a diagram showing an embodiment of a system for 3D modeling of a user's face. In the example, system 400 includes client device 404, network 406, and 3D modeling server 408. Network 406 includes high speed data networks and/or telecommunications networks. In some embodiments, client device 404 is configured to communicate to 3D modeling server 408 over network 406.

Client device 404 is configured to record or receive a set of one or more recorded 2D images corresponding to a user's head at various orientations. In various embodiments, a "recorded image" is sometimes referred to as an "input image." Examples of client device 404 may include a laptop computer, a desktop computer, a tablet device, a mobile device, a smart phone, and/or any computing device. For example, the set of one or more input images may comprise a video or a series of snapshots. In some embodiments, client device 404 includes or is connected to a camera device. The camera device and/or a processor of client device 404 that is running an application can capture a set of images of the user's head as user 402 turns his or her head in different directions (e.g., as instructed through a user interface of the application). In various embodiments, the set of input images is sent to 3D modeling server 408 for 3D modeling server 408 to process. In some embodiments, client device 404 includes a user interface through which the user may interact and view a playback associated with the input images.

3D modeling server 408 is configured to receive one or more input images from client device 404. In various embodiments, 3D modeling server 408 is configured to search for a set of parameter values that will be used to generate a 3D model of a face and then generate a 2D image (this 2D image is sometimes referred to as a "synthetic image" or a "2D synthetic image") from the generated 3D model of the face to match the user's face that appears in the input image(s). In various embodiments, the set of parameter values includes (e.g., 20) shape coefficients and (e.g., 20) texture coefficients associated with respective shape and texture components of a PCA model, which will be used to generate a 3D model of the face. In various embodiments, the set of parameter values further includes (e.g., seven) camera parameters (e.g., associated with camera focal length, camera rotation, and camera translation), which will be used to generate a 2D synthetic image from the 3D model of the face that is generated using the shape and texture coefficients. For example, the 3D model of the face may be generated by applying the candidate shape and texture coefficient values to new face shape formula (1) and new face texture formula (2), above. For example, 3D modeling server 408 is configured to generate the 2D synthetic image from the 3D model of the face by using the camera parameters to project the generated 3D model of the face onto the 2D surface of the focal plane of the camera. The projection onto the 2D surface is the view of the user's face as seen from the camera.

3D modeling server 408 is configured to determine a desired set of parameter values that will result in a synthetic image that matches (e.g., within a given tolerance of) an input image by searching (e.g., iterating through) various different candidate parameter values and determining various candidate synthetic images. In various embodiments, a "desired set of parameter values" results in a synthetic image that meets a set of criteria for ceasing the evaluation of new candidate sets of parameter values. In various embodiments, a synthetic image that is generated by the desired set of parameter values "matches" the input image. 3D modeling server 408 is configured to determine a degree to which a candidate set of parameter values yields a candidate synthetic image that matches the input image by computing a cost (e.g., an error value) of the candidate synthetic image. The cost of a candidate synthetic image is determined by comparing the candidate synthetic image to the input image. In various embodiments, the cost of the candidate synthetic image is a numeric value that represents a degree to which the candidate synthetic image is different from the input image. As such, a smaller cost indicates that the candidate synthetic image is relatively similar to the input image and a larger cost indicates that the candidate synthetic image is relatively dissimilar to the input image. In various embodiments, 3D modeling server 408 is configured to determine the cost of the candidate synthetic image by evaluating the candidate synthetic image using one or more cost functions. In various embodiments, 3D modeling server 408 is configured to determine a cost of a candidate synthetic image based on one or more cost functions determined using optical flow. In various embodiments, 3D modeling server 408 is configured to apply optical flow from the candidate synthetic image to the input image to determine a displacement vector $(d_x, d_y)$ that indicates the location in the input image to which each visible pixel of the candidate synthetic image should move. In some embodiments, optical flow is used to determine an optical flow landmarks cost and separately, an optical flow color cost, as will be described further below. In various embodiments, 3D modeling server 408 is configured to use the determined cost associated with the candidate synthetic image to determine whether to stop searching (e.g., because the determined cost associated with the candidate synthetic image indicates that the current candidate set of parameter values is the desired set of parameter values) or whether to generate a new candidate set of parameter values to evaluate. In various embodiments, 3D modeling server 408 is configured to generate a new candidate set of parameter values to evaluate based at least in part on the cost associated with the previous candidate synthetic image. For example, the new candidate set of parameter values may include at least one parameter value that is different from the previously evaluated candidate set of parameter values. For example, examples of techniques that may be used to generate a new candidate set of parameters to evaluate include the Gauss-Newton algorithm, the Levenberg-Marquardt algorithm, and the gradient descent algorithm.

By using cost functions associated with optical flow, 3D modeling server 408 is able to efficiently determine the desired set of parameter values that will yield a synthetic image that matches the input image by avoiding the local minima problem associated with a conventional pixel-level intensity cost function, as will be described in further detail below.

Generating a 3D model of a user's face has many applications. Example applications of generating a 3D model of a face include a virtual try-on of facial accessories (e.g., glasses, makeup, jewelry), recommendation engines (e.g., of facial accessories) that are based on an analysis of a user's face type, pose detection (e.g., identifying the frontal frame in a video of different poses of a user's face), facial recognition (e.g., for automatically tagging photos), and facial reconstruction (e.g., making an avatar of a user).

Figure 5:
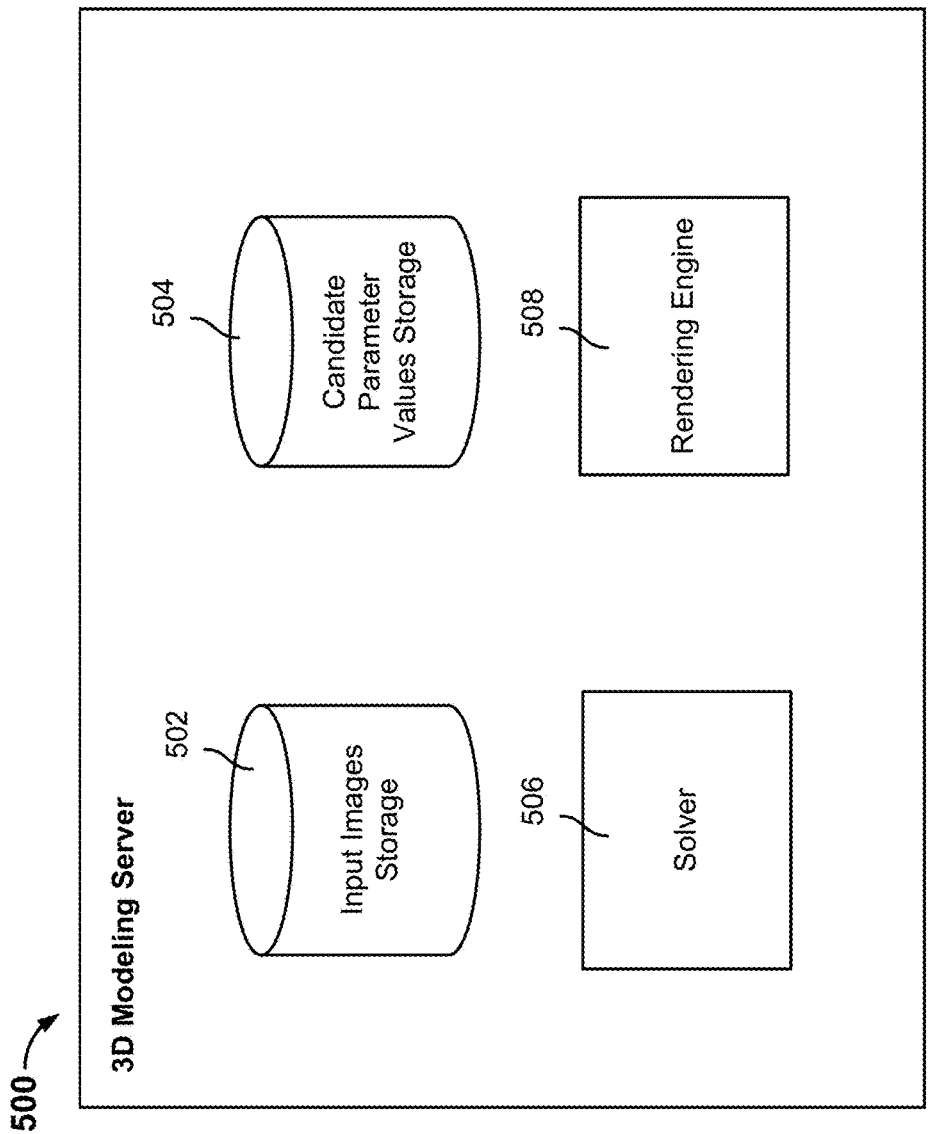
FIG. 5 shows an example of a 3D modeling server.

FIG. 5 shows an example of a 3D modeling server. In some embodiments, 3D modeling server 408 of system 400 of FIG. 4 may be implemented using the example 3D modeling server described in FIG. 5. In the example of FIG. 5, the 3D modeling server 500 includes input images storage 502, candidate parameter values storage 504, solver 506, and rendering engine 508. Each of solver 506 and rendering engine 508 may be implemented using one or both of software and hardware.

Input images storage 502 is configured to store input images of faces of one or more users. In some embodiments, input images storage 502 stores images that have been recorded or otherwise captured by a camera.

Solver 506 is configured to search for a desired set of parameter values to generate a synthetic image that matches (e.g., within a given tolerance) a corresponding input image stored in input images storage 502. In some embodiments, solver 506 is configured to search for values to the following parameters: 20 shape coefficients $\alpha_1, \ldots, \alpha_{N=20}$ and 20 texture coefficients $\beta_1, \ldots, \beta_{N=20}$ of a PCA model, and seven camera parameters (f, $o_x$, $o_y$, $o_z$, $t_x$, $t_y$, $t_z$). Solver 506 is configured to iterate through various candidate sets of parameter values until solver 506 is configured to determine a set of parameter values that generates a synthetic image that matches the corresponding input image. As mentioned above, in some embodiments, solver 506 is configured to use the 20 shape coefficients $\alpha_1, \ldots, \alpha_{N=20}$ and 20 texture coefficients $\beta_1, \ldots, \beta_{N=20}$ of a PCA model and formulae (1) and (2), above, to generate a 3D model of a face. As mentioned above, in some embodiments, rendering engine 508 is configured to use the seven camera parameters (f, $o_x$, $o_y$, $o_z$, $t_x$, $t_y$, $t_z$) to project the generated 3D model of the face onto the 2D surface of the focal plane of the camera to generate a candidate synthetic image. Rendering engine 508 is configured to generate a cost (e.g., an error) corresponding to the candidate synthetic image by comparing the candidate synthetic image to the corresponding input image. In various embodiments, solver 506 is configured to generate the cost corresponding to the candidate synthetic image by applying optical flow to the candidate synthetic image and the corresponding input image to determine a displacement vector ($d_x$, $d_y$) that indicates the location in the input image to which each visible pixel of the candidate synthetic image should move. In some embodiments, solver 506 is configured to generate a first optical flow related cost function associated with landmarks. In some embodiments, solver 506 is configured to generate a second optical flow related cost function associated with color. In some embodiments, solver 506 determines the aggregated cost corresponding to the candidate synthetic image based at least in part on combining the cost from the first optical flow related cost function associated with landmarks and the cost from the second optical flow related cost function associated with color. In some embodiments, solver 506 determines whether the current candidate set of parameter values is the desired set of parameter values corresponding to the input image based on the aggregated cost associated with the candidate synthetic image. For example, if the aggregated cost associated with the candidate synthetic image is below a threshold and/or if another stop criterion is met, solver 506 determines that the current candidate set of parameter values is the desired set of parameter values corresponding to the input image and stops iterating through new candidate sets of parameter values. Otherwise, if a stop condition is not met, solver 506 is configured to continue iterating through new candidate sets of parameter values, rendering engine 508 is configured to continue generating new candidate synthetic images associated with the new candidate sets of parameter values, and solver 506 is configured to continue determining the costs of the candidate synthetic images until a stop criterion is met.

Figure 6:
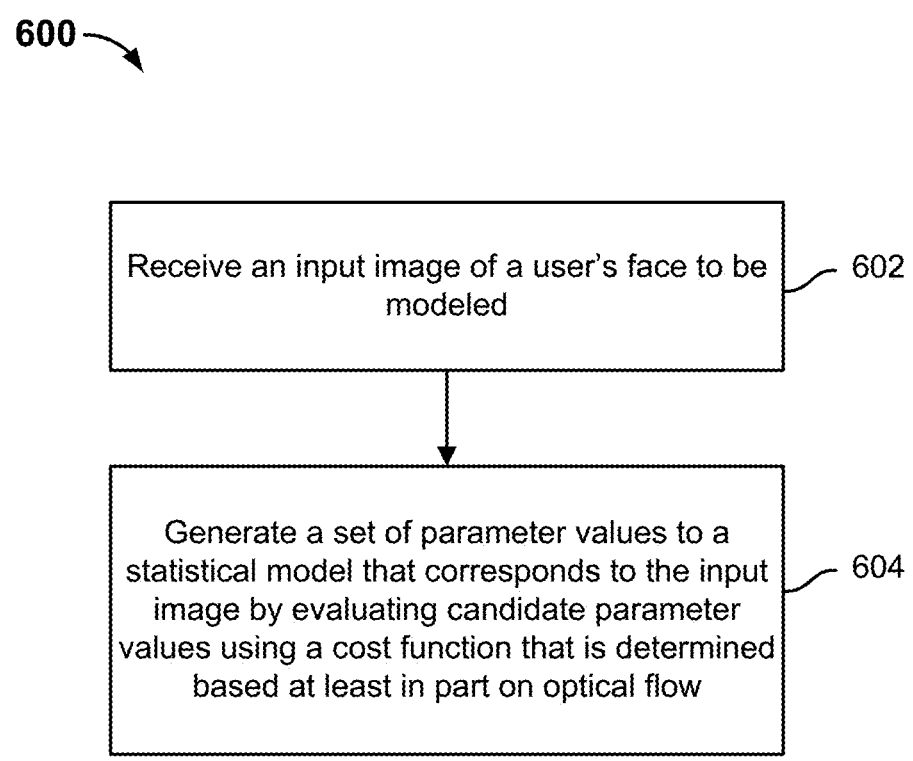
FIG. 6 is a flow diagram showing an embodiment of a process for 3D modeling of a user's face.

FIG. 6 is a flow diagram showing an embodiment of a process for 3D modeling of a user's face. In some embodiments, process 600 is implemented at system 400 of FIG. 4. Specifically, in some embodiments, process 600 is implemented at 3D modeling server 408 of system 400 of FIG. 4.

At 602, an input image of a user's face to be modeled is received. The input image of a user's face comprises a captured or recorded image of the user's face. In various embodiments, the input image of the user's face may comprise a front profile of the user's face, a side profile of the user's face, or a profile of the user's face at an angle in between the front profile and the side profile.

At 604, a set of parameter values to a statistical model that corresponds to the input image is generated by evaluating candidate parameter values using a cost function that is determined based at least in part on optical flow. In various embodiments, parameter values that are to be input into a PCA model comprising one or more shape components and one or more texture components to generate a 3D model of a face that (e.g., optimally or within a given tolerance) matches the user's face in the input image are determined. In some embodiments, in addition to the parameter values to be input into the PCA model, additional parameters associated with a camera focal length, camera rotation (e.g., in 3D space), and camera translation (e.g., in 3D space) are also to be determined. In various embodiments, the parameter values that are to be input into a PCA model and also camera parameter values are determined by iterating through various candidate sets of parameter values, generating 3D models of faces using the candidate sets of parameter values, projecting the generated 3D models of faces onto 2D surfaces to generate candidate synthetic images, and computing costs between each candidate synthetic image and the input image. In various embodiments, the cost between each candidate synthetic image and the input image is determined based on an optical flow from the candidate synthetic image to the input image.

Figure 7:
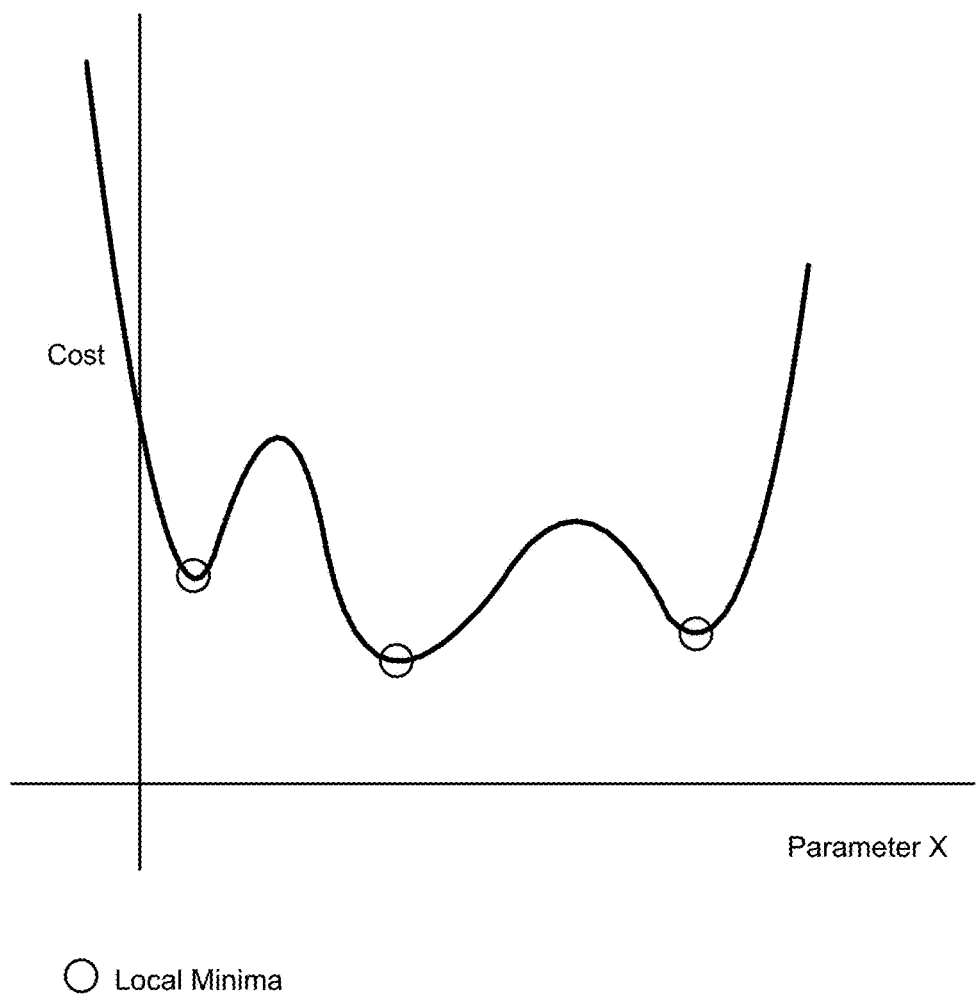
FIG. 7 is a diagram showing an example graph of the cost of a synthetic image as determined by a conventional pixel-level intensity cost function for various values of parameter value X.

FIG. 7 is a diagram showing an example graph of the cost of a synthetic image as determined by a conventional pixel-level intensity cost function for various values of parameter value X. The pixel-level intensity cost function is a conventional cost function that is used to determine a cost of a synthetic image and is typically used to evaluate a candidate set of parameter values. The per-pixel intensity cost is a pixel by pixel comparison between a synthesized image and the input image. If the per-pixel intensity cost is close to zero, then the 3D synthesized image is expected to very closely match the input image.

First, the pixel value of a point (x,y) on an image is defined to be:

$$I_{input}(x,y)=(I_r(x,y), I_g(x,y), I_b(x,y))^T \qquad (3)$$

The per-pixel intensity cost function would be:

$$C_{pixel} = \Sigma_{x,y} ||I_{input}(x,y) - I_{synthetic}(x,y)||^2 \qquad (4)$$

The per-pixel intensity cost function compares each pixel from the synthesized image to the input image. As the per-pixel intensity cost function decreases, it is expected for the synthesized image to appear more and more similar to the input image.

One drawback of using a noisy conventional cost function such as the pixel-level intensity cost function to compute a cost of a candidate synthetic image is that as the value of parameter X (e.g., which could be a shape coefficient, a texture coefficient, or a camera parameter) is varied in the search for a desired set of parameter values, and so the cost curve yielded by the pixel-level intensity cost function results in multiple local minima, as shown in the graph of FIG. 7. The reason for the presence of the local minima is that a pixel is a discrete value with a fixed size and as a result of applying formulae (3) and (4) above, the per-pixel intensity cost exhibits a jagged shape. This property makes it difficult for a solver to quickly find the optimal parameter values that minimize the per-pixel intensity cost function. As such, the per-pixel intensity cost function is an inefficient cost function to use in searching for a desired set of parameter values to use in 3D modeling of a user's face.

Figure 8:
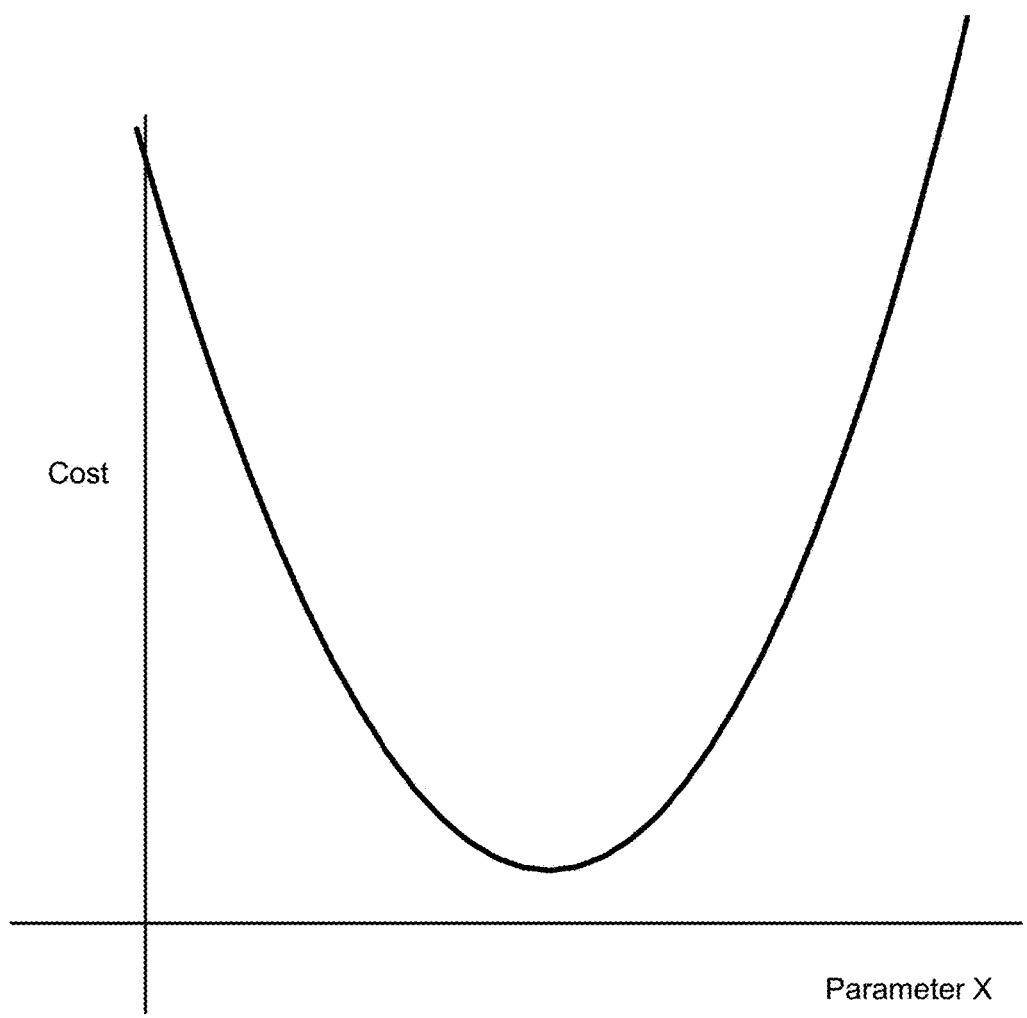
FIG. 8 is a diagram showing an example graph of the cost of a synthetic image as determined by an optical flow related cost function for various values of parameter value X.

FIG. 8 is a diagram showing an example graph of the cost of a synthetic image as determined by an optical flow related cost function for various values of parameter value X. In contrast to the cost graph associated with the conventional per-pixel intensity cost function, the cost graph associated with an optical flow related cost function, as will be described in further detail below, yields a much smoother curve (e.g., a curve with fewer minima). Because optical flow related cost functions are smooth relative to the per-pixel intensity cost function, optical flow related cost functions therefore mitigate the problem of exhibiting several local minima in a cost curve. As a result, using optical flow related cost functions enables the desired set of parameter values to use in 3D modeling of a user's face to be efficiently determined.

In various embodiments, one or more cost functions that are determined based on the optical flow of a candidate synthetic image to an input image replace the per-pixel intensity cost function in determining an aggregated cost of the candidate synthetic image. In various embodiments, costs computed from one or more cost functions that are determined based on the optical flow of a candidate synthetic image to an input image are combined/aggregated with zero or more costs determined for the candidate synthetic image using other types of cost functions to determine an aggregate cost of the candidate synthetic image in evaluating the candidate set of parameter values that was used to generate the candidate synthetic image.

Figure 9:
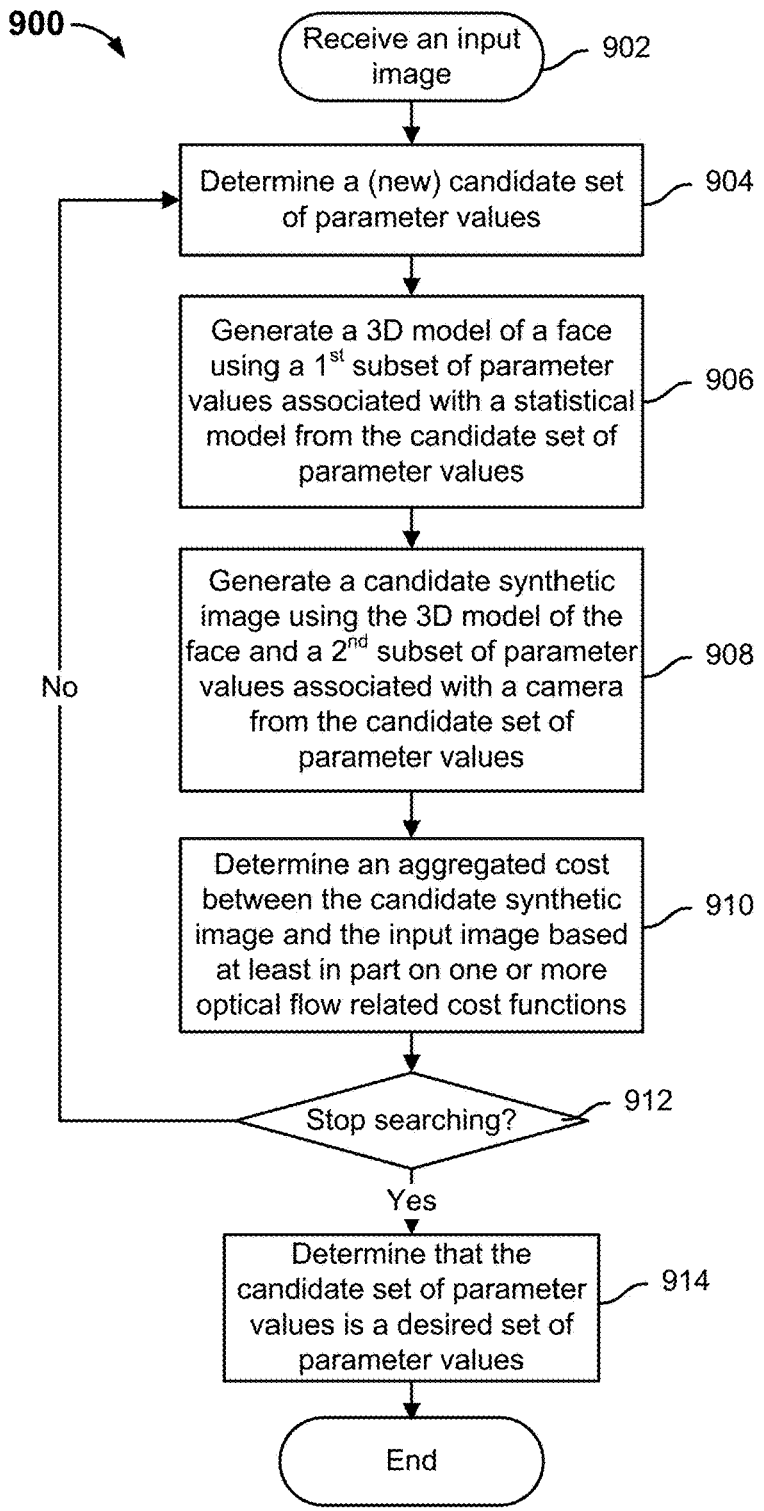
FIG. 9 is a flow diagram showing an example process of searching for a desired set of parameters for 3D modeling a user's face in an input image.

FIG. 9 is a flow diagram showing an example process of searching for a desired set of parameters for 3D modeling a user's face in an input image. In some embodiments, process 900 is implemented at system 400 of FIG. 4. Specifically, in some embodiments, process 900 is implemented at 3D modeling server 408 of system 400 of FIG. 4.

Process 900 is an example process by which a desired set of parameter values is iteratively searched for 3D modeling of a user's face in an input image, based on using one or more optical flow related cost functions.

At 902, an input image is received.

At 904, a (new) candidate set of parameter values is determined. In the event that no candidate parameter values have been previously determined for the input image, a default set of parameter values (e.g., the parameter values are initialized to zero) or a randomly generated set of parameter values may be used. In some embodiments, the candidate set of parameter values includes a first subset of parameter values that comprises values to (e.g., 20) shape coefficients and (e.g., 20) texture coefficients associated with respective shape and texture components from a PCA model. In some embodiments, the candidate set of parameter values includes a second subset of parameter values that comprises values to (e.g., seven) camera parameters.

At 906, a 3D model of a face is generated using a first subset of parameter values associated with a statistical model from the candidate set of parameter values. The 3D model of a candidate face is generated using the (e.g., 20) shape coefficients and (e.g., 20) texture coefficients of the candidate set of parameter values and formulae such as formulae (1) and (2), above, for example.

At 908, a candidate synthetic image is generated using the 3D model of the face and a second subset of parameter values associated with a camera from the candidate set of parameter values. The (e.g., seven) camera parameters of the candidate set of parameter values are used to project the 3D model of the face onto a 2D surface to obtain a 2D image of the face. In some embodiments, the generated 2D image of the face is overlaid on the input image to generate the candidate synthetic image. The reason that the generated 2D image of the candidate face is overlaid on the input image to generate the candidate synthetic image is because the 3D model of the candidate face only models the user's facial features but not other features on the user's head, such as hair and/or the background shown behind the user's head for example. As such, by overlaying the 2D image of the face on the input image to generate the candidate synthetic image, the candidate synthetic image can be compared to the input image in a way that would emphasize the difference in the facial areas of both images.

At 910, an aggregated cost between the candidate synthetic image and the input image is determined based at least in part on one or more optical flow related cost functions. Costs between the candidate face and the input image are determined based on one or more optical flow related cost functions. In some embodiments, the one or more optical flow related cost functions include an optical flow landmarks cost function and an optical flow color cost function. In various embodiments, the more similar the candidate synthetic image is to the input image, the smaller the optical flow landmarks cost and the optical flow color cost will be. Conversely, the less similar the candidate synthetic image is to the input image, the greater the optical flow landmarks cost and the optical flow color cost will be. In some embodiments, the costs determined by the one or more optical flow related cost functions are combined (e.g., added) with the cost(s) determined between the candidate face and the input image using cost functions other than the pixel-level intensity cost function.

For example, a first such other cost function is the landmarks cost function. The landmarks cost function is typically used with a state of the art landmarks detector. A landmarks detector will locate different landmarks on the human face such as eye corners, nose tips, and the face contour. When a 3D model of a face is created, the corresponding points can be located on the created model. Projecting these 3D landmarks to 2D enables the 2D Euclidean distance to be measured from the model landmarks to the detected landmarks of the input image. Therefore, the landmarks cost function may be defined as the following:

$$C_{land}=\Sigma_j(q_{x,j}-p_{x,j})^2+(q_{y,j}-p_{y,j})^2 \qquad (5)$$

where $C_{land}$ represents the landmarks cost, $(q_{x,j}, q_{y,j})$ is a detected landmarks location, and $(p_{x,j}, p_{y,j})$ is the corresponding projected 3D vertex from the 3D model of the face.

Furthermore, the optical flow related functions as described herein achieve 3D morphable modeling by fitting to a set of dense landmarks (e.g., each pixel corresponding to an optical flow vector is potentially a target landmark for a 3D vertex) obtained using optical flow. This is in contrast to the set of sparse landmarks (e.g., usually between 50 and 100) that a landmarks detector gives.

For example, a second such other cost function is the Gaussian prior cost function. The Gaussian prior cost function is derived from the different heads located in a 3D head dataset. This cost function makes more likely faces (e.g., candidate faces with shape and texture coefficient values that are within their respective range of values that were produced by a prior Principal Component Analysis) have a lower cost. Conversely, implausible faces (e.g., candidate faces with shape and texture coefficient values that are not within their respective range of values that were produced by a prior Principal Component Analysis) would have a higher cost associated with them. This function can be defined as follows:

$$C_{Prior} = \Sigma_i \frac{\alpha_i^2}{\sigma_{S,i}^2} + \frac{\beta_i^2}{\sigma_{T,i}^2} \quad (6)$$

where $C_{prior}$ represents the Gaussian prior cost, $\alpha_i$ represents the shape coefficient of the PCA component $S_i$, and $\beta_i$ represents the texture coefficient of the PCA component $T_i$. $\sigma_{S,i}$, and $\sigma_{T,i}$ are the corresponding standard deviations of each component.

At 912, it is determined whether to stop searching for a desired set of parameter values. In the event that it is determined to stop searching for a desired set of parameter values, control is transferred to 914. In some embodiments, one or more stop criteria may be configured to determine when the current candidate set of parameter values is the desired set of parameter values for an input image. One example stop criterion is that the aggregate cost between iterations of process 900 falls below a threshold. A second example stop criterion is that a maximum number of iterations of process 900 has been reached. A third example stop criterion is that the change in the parameter values between each iteration reaches below a threshold. Otherwise, in the event that it is determined to continue searching for a desired set of parameter values, control is returned to 904, at which a new candidate set of parameter values is determined. In some embodiments, the new candidate set of parameter values is determined based at least in part on the aggregated cost associated with the immediately previous candidate synthetic image that was generated based on the immediately previous candidate set of parameter values. For example, the value of a parameter may be increased if it is observed that a previous increase in that parameter value has led to a decrease in the aggregate cost.

Figure 10A:
FIGS. 10A, 10B, and 10C describe an example of optical flow between two images.
Figure 10B:
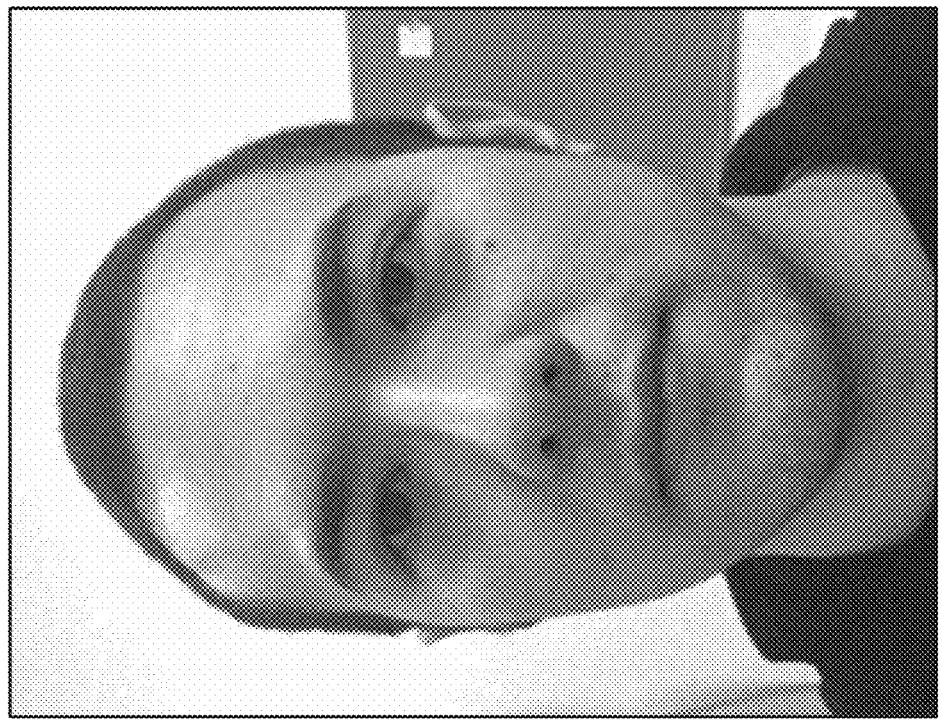
Figure 10C:
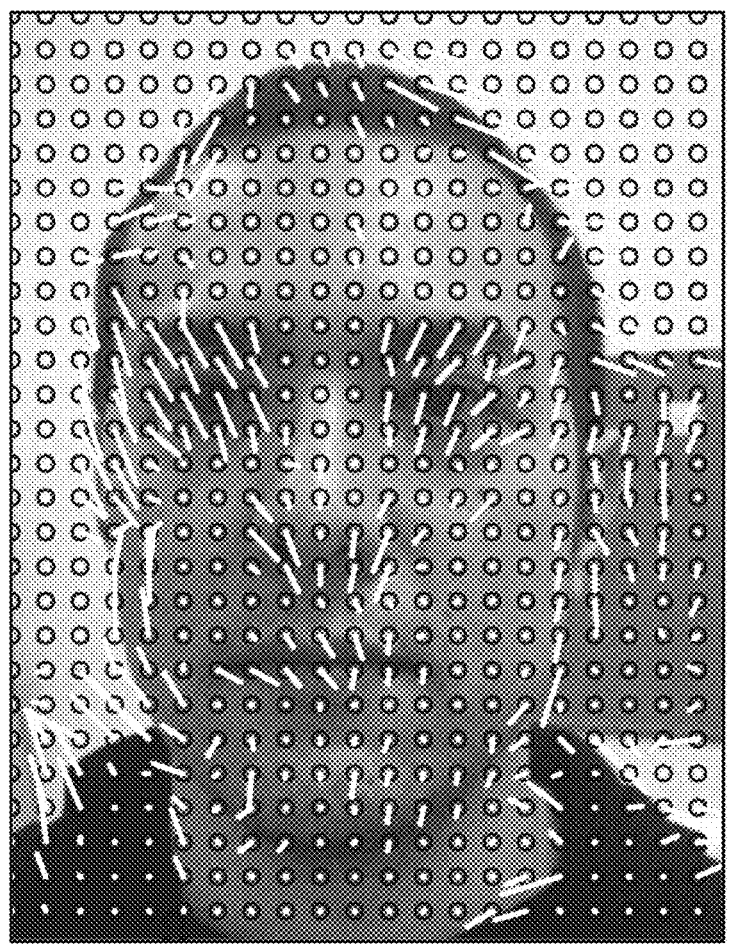

FIGS. 10A, 10B, and 10C describe an example of optical flow between two images. Optical flow is the motion of objects between two images. Optical flow is sometimes applied to two neighboring frames of a video. Due to this property, optical flow is expected to display similar motion for neighboring pixels. In various emboidments described herein, optical flow is used for 2D registration, where two different images are input into the optical flow.

Assume that the image in FIG. 10A is Image A and the image in FIG. 10B is Image B and that optical flow is used to find the movements of visible pixels from their original locations (e.g., $(x_A, y_A)$) in Image A to their new locations in new locations (e.g., $(x_B, y_B)$) in Image B. Put another way, Image A is input as the earlier frame and Image B is input as the later frame into optical flow in this example.

Optical flow from Image A to Image B provides a displacement vector (dx, dy) that indicates the new location in Image B to which each pixel that was visible in Image A has moved. Therefore, the new location in Image B of a pixel that was visible in Image A may be determined using the formulation:

$$x_B = x_A + dx \quad (7)$$

$$y_B = y_A + dy \quad (8)$$

If two identical images are given to optical flow, optical flow will return the zero vector. However, if the two input images are very similar but have a slight displacement, optical flow will give a displacement vector following the motion of the moved objects (e.g., pixels). Obviously, if two extremely different images or images with a large displacement are given to optical flow, optical flow will fail to find a correspondence between them and fail to give a correct displacement vector.

FIG. 10C shows an example of a visual representation of the respective displacements of some pixels as provided by optical flow for Image A of FIG. 10A and Image B of FIG. 10B. For example, each concentric circle represents the original location (e.g., $(x_A, y_A)$) of every 20th pixel in Image A and the line that points from the center of a concentric circle represents the length that the pixel was displaced from its original location in Image A to arrive at its new location in Image B. Given that Image A and Image B are images of different people, the displacements of pixels from Image A to Image B are relatively large, as shown in the visual representation of FIG. 10C. Conversely, if Image A and Image B were very similar images, the displacements of pixels from Image A to Image B would be relatively small.

Figure 11:
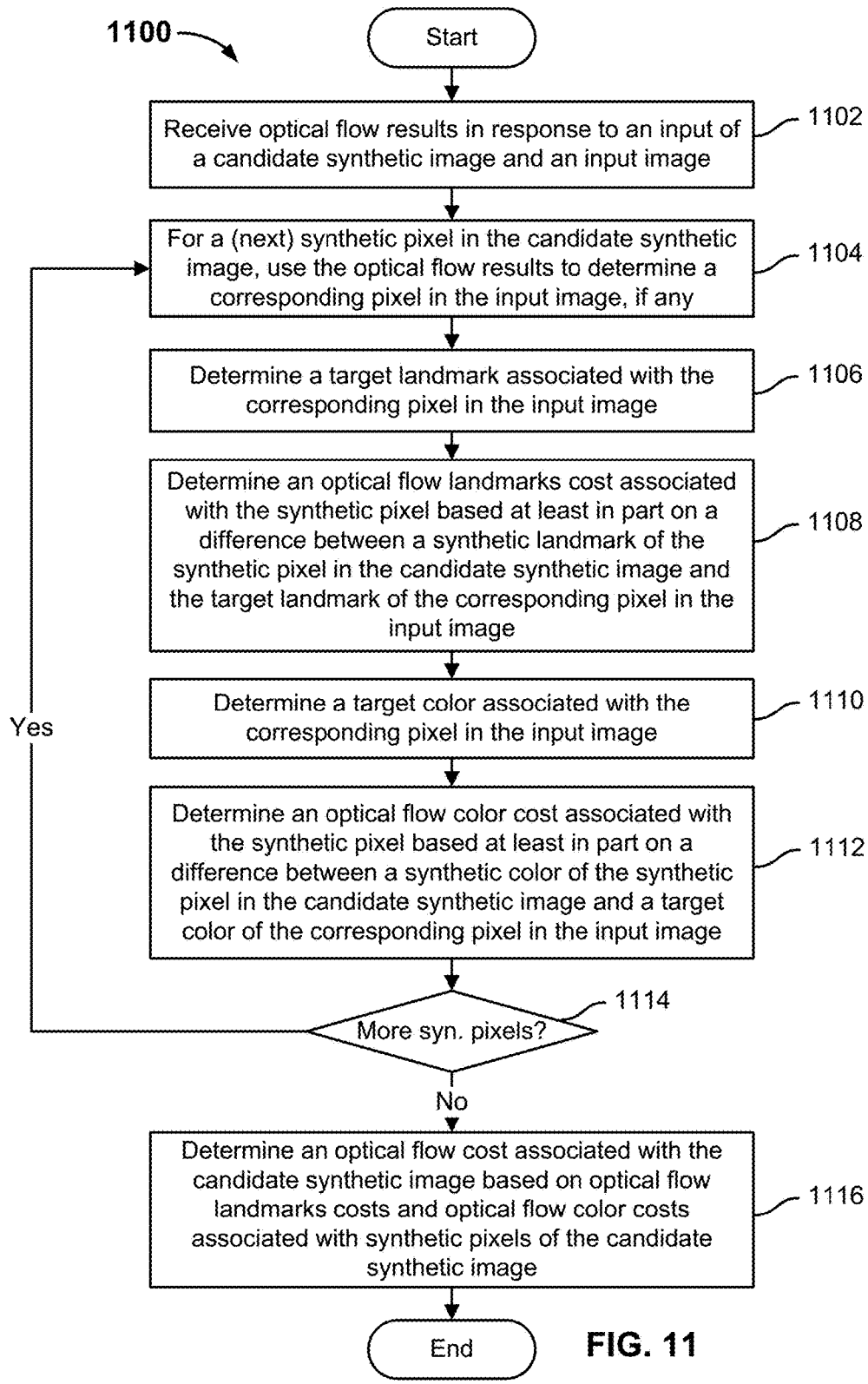
FIG. 11 is a flow diagram showing an example process of determining an optical flow related cost associated with a candidate synthetic image.

FIG. 11 is a flow diagram showing an example process of determining an optical flow related cost associated with a candidate synthetic image. In some embodiments, process 1100 is implemented at system 400 of FIG. 4. Specifically, in some embodiments, process 1100 is implemented at 3D modeling server 408 of system 400 of FIG. 4.

Process 1100 is an example process by which an optical flow related cost is determined for a candidate synthetic image based on a pixel-level optical flow landmarks cost function and a pixel-level optical flow color cost function. Process 1100 uses optical flow to determine the displacement of pixels from the candidate synthetic image to an input image for which a desired set of parameter values is to be determined.

In some embodiments, step 604 of process 600 of FIG. 6 is implemented at least in part using process 1100. In some embodiments, step 910 of process 900 of FIG. 9 is implemented at least in part using process 1100.

At 1102, optical flow results in response to an input of a candidate synthetic image and an input image are received. A candidate synthetic image is generated from a candidate set of parameter values during the search for a desired set of parameter values to correspond to an input image. Using techniques described above, to evaluate the candidate set of parameter values, in some embodiments, the candidate synthetic image and the input image are input into an optical flow analysis, where the candidate synthetic image is designated as being the earlier image and the input image is designated as being the later image. The results of the optical flow analysis indicate a displacement (e.g., vector) that indicates a new location in the input image to which each pixel that is visible in the candidate synthetic image has moved. In some other embodiments, to evaluate the candidate set of parameter values, in some embodiments, the candidate synthetic image and the input image are input into an optical flow analysis, but the input image is designated as being the earlier image and the candidate synthetic image is designated as being the later image.

In some embodiments, it is configurable for which pixels in the candidate synthetic image displacements will be computed by the optical flow analysis. For example, fewer than all of the pixels in the candidate synthetic image may be configured to have their displacements computed by the optical flow analysis to speed up and/or reduce the consumption of computer resources needed by the optical flow analysis.

At 1104, for a (next) synthetic pixel in the candidate synthetic image, the optical flow results are used to determine a corresponding pixel in the input image, if any. In some embodiments, a "synthetic pixel" refers to a pixel that is found in a (candidate) synthetic image. The optical flow results are used to determine whether a visible synthetic pixel in the candidate synthetic image can be found within the input image. In some embodiments, a "corresponding pixel" of the input image refers to a displaced synthetic pixel of the candidate synthetic image. In some instances, a corresponding pixel in the input image may not exist for a synthetic pixel of the candidate synthetic image because the synthetic pixel is no longer visible in the input image.

At 1106, a target landmark associated with the corresponding pixel in the input image is determined. In various embodiments, a "target landmark" associated with the corresponding pixel in the input image refers to the new location (e.g., $(x_{input}, y_{input})$) of the corresponding pixel in the input image.

At 1108, an optical flow landmarks cost associated with the synthetic pixel is determined based at least in part on a difference between a synthetic landmark of the synthetic pixel in the candidate synthetic image and the target landmark of the corresponding pixel in the input image. In various embodiments, a "synthetic landmark" associated with the synthetic pixel in the candidate synthetic image refers to the location (e.g., $(x_{syn}, y_{syn})$) of the synthetic pixel in the candidate synthetic image.

If (dx, dy) represented the respective displacements of $(x_{syn}, y_{syn})$, then $(x_{input}, y_{input})$ may also be rewritten as $(x_{syn}+dx, y_{syn}+dy)$.

In some embodiments, the optical flow landmarks cost associated with the synthetic pixel is determined as follows:

$$C_{OF\_Landmark}=\Sigma_j(x_{input}-x_{syn})^2(y_{input}-y_{syn})^2 \quad (9)$$

where $C_{OF\_Landmark}$ is a pixel-level optical flow landmarks cost, $(x_{syn}, y_{syn})$ is the old location of the synthetic pixel in the candidate synthetic image, and $(x_{input}, y_{input})$ is the new location of the corresponding pixel in the input image.

At 1110, a target color associated with the corresponding pixel in the input image is determined. In various embodiments, a "target color" associated with the corresponding pixel in the input image refers to the color of the corresponding pixel. For example, the target color can be represented as $(r_{input}, g_{input}, b_{input})$.

At 1112, an optical flow color cost associated with the synthetic pixel is determined based at least in part on a difference between a synthetic color of the synthetic pixel in the candidate synthetic image and a target color of the corresponding pixel in the input image. In various embodiments, a "synthetic color" associated with the synthetic pixel in the candidate synthetic image refers to the color (e.g. $(r_{syn}, g_{syn}, b_{syn})$) of the synthetic pixel in the candidate synthetic image.

In some embodiments, the optical flow color cost associated with the synthetic pixel is determined as follows:

$$C_{OF\_Color}=\Sigma_j(r_{input}-r_{syn})^2+(g_{input}-g_{syn})^2+(b_{input}-b_{syn})^2 \quad (10)$$

where $C_{OF\_Color}$ is a pixel-level optical flow color cost, $(r_{syn}, g_{syn}, b_{syn})$ is the color of the synthetic pixel in the candidate synthetic image, and $(r_{input}, g_{input}, b_{input})$ is the color of the corresponding pixel in the input image.

At 1114, it is determined whether there is at least one more synthetic pixel in the candidate synthetic image. In the event that there is at least one more synthetic pixel in the candidate synthetic image, control is returned to 1104 and steps 1104 through 1112 are performed on the next synthetic pixel in the candidate synthetic image. If there is another pixel visible in the candidate synthetic image for which the optical flow related costs have not been computed, steps 1104 through 1112 are performed on one such other pixel. Otherwise, in the event that there are no more such synthetic pixels in the candidate synthetic image, control is transferred to 1116.

At 1116, an optical flow cost associated with the candidate synthetic image is determined based on optical flow landmarks costs and optical flow color costs associated with the synthetic pixels of the candidate synthetic image. The optical flow landmarks costs computed for at least a subset of the synthetic pixels of the candidate synthetic image are combined (e.g., added together) to determine the optical flow landmarks cost for the candidate synthetic image. The optical flow color costs computed for at least a subset of the synthetic pixels of the candidate synthetic image are combined (e.g., added together) to determine the optical flow color cost for the candidate synthetic image.

Figure 12:
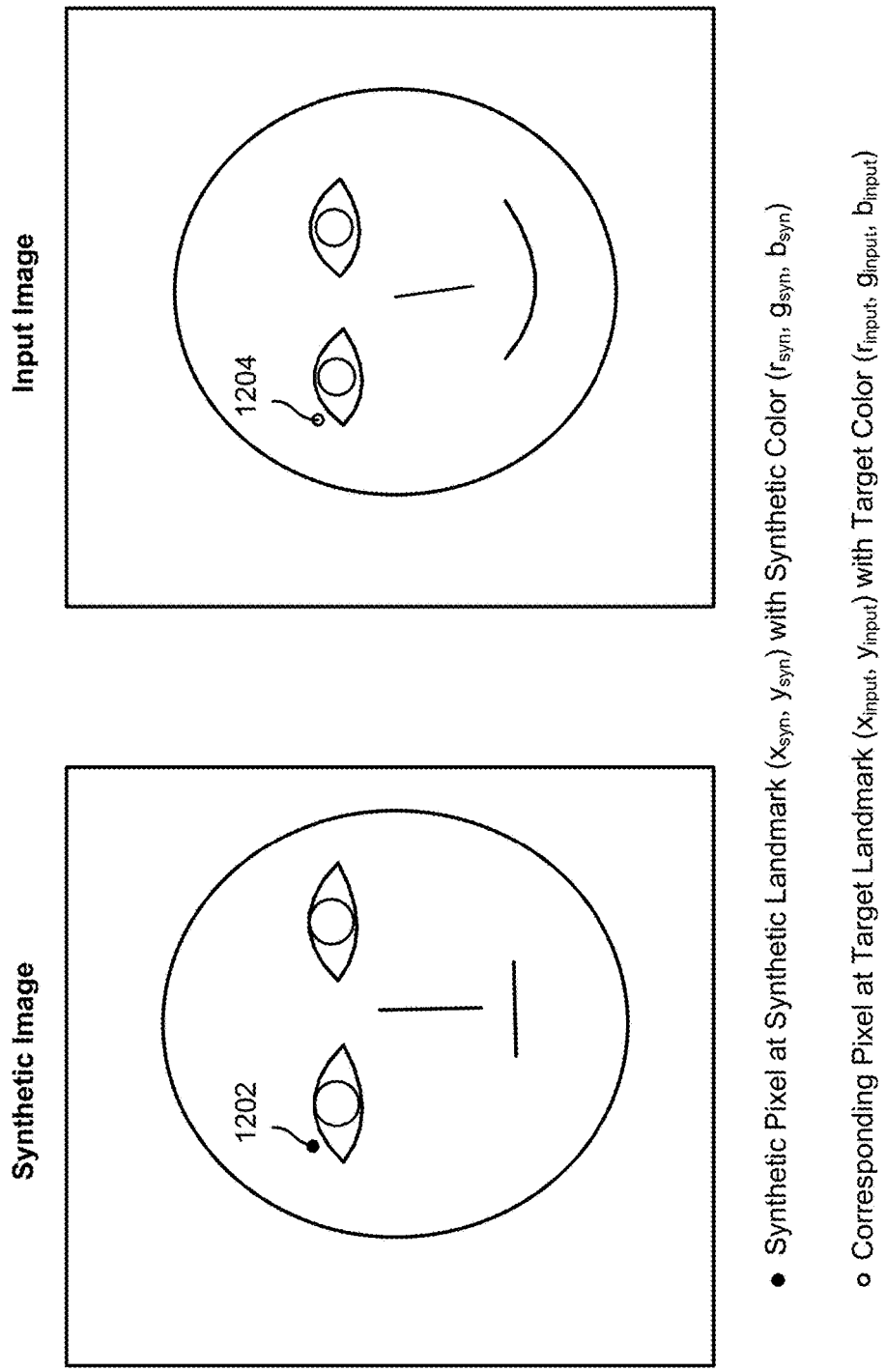
FIG. 12 is a diagram showing an optical flow for a candidate synthetic image and input image.

FIG. 12 is a diagram showing an optical flow for a candidate synthetic image and input image. For synthetic pixel 1202 of the 2D synthetic image that includes a face that is modeled by a 3D PCA model, optical flow identifies corresponding pixel 1204 in the input image of a user's face that is being modeled. Optical flow identifies the distance between coordinates $(x_{syn}, y_{syn})$ of synthetic pixel 1202 and coordinates $(x_{input}, y_{input})$ of corresponding pixel 1204. As mentioned above, the coordinates $(x_{input}, y_{input})$ of corresponding pixel 1204 are also sometimes referred to as the "target landmark" of corresponding pixel 1204. As mentioned above, the "synthetic color" associated with synthetic pixel 1202 in the synthetic image refers to the color (e.g., $(r_{syn}, g_{syn}, b_{syn})$) of synthetic pixel 1202 in the synthetic image. As mentioned above, the "target color" associated with corresponding pixel 1204 in the input image refers to the color (e.g., $(r_{input}, g_{input}, b_{input})$) of corresponding pixel 1204 in the input image. As noted in formula (9) above, the optical flow landmarks cost associated with the (candidate) synthetic image is determined based on the Euclidean distance between the location/coordinates of each synthetic pixel and the location/coordinates of each of its respective corresponding pixels. As noted in formula (10) above, the optical flow color cost associated with the (candidate) synthetic image is determined based on the Euclidean distance between the color of each synthetic pixel and the color of each of its respective corresponding pixels.

In some embodiments, the optical flow landmarks cost and the optical flow color cost associated with a candidate synthetic image are combined together with one or more other costs that have been computed for the candidate synthetic image to determine an overall or aggregated cost associated with the candidate synthetic image. In some embodiments, the optical flow landmarks cost and the optical flow color cost associated with a candidate synthetic image are combined together specifically with the Gaussian prior cost associated with the candidate synthetic image (as described with formula (6), above) to determine the aggregated cost associated with the candidate synthetic image. As described above, the aggregated cost associated with the candidate synthetic image is used, in some embodiments, to determine whether the candidate set of parameter values that was used to construct the candidate set of parameter values is the desired set of parameter values. For example, the aggregated cost associated with the candidate synthetic image is determined based on the weighting each of the optical flow color cost, the optical flow landmarks cost, and the Gaussian prior cost with respective weights and then combining the weighted costs, as described below:

$$C_{overall} = w_1 C_{OF\_Landmark} + w_2 C_{OF\_Color} + w_3 C_{prior} \qquad (11)$$

where $C_{overall}$ represents the overall cost associated with a candidate synthetic image, $C_{OF\_Landmark}$ represents the optical flow landmarks cost associated with the candidate synthetic image, $C_{OF\_color}$ represents the optical flow color cost associated with the candidate synthetic image, and $C_{prior}$ represents the Gaussian prior cost associated with the candidate synthetic image.

FIGS. 13A through 13I show an example of iterating through various candidate sets of parameter values using optical flow related cost functions.

Figure 13A:
FIGS. 13A through 13B show an example of iterating through various candidate sets of parameter values using optical flow related cost functions.

FIG. 13A shows an input image of a user's face. In the example of FIGS. 13A through 13I, a process such as process 900 of FIG. 9 is executed to evaluate various candidate sets of parameter values and corresponding synthetic images to determine a desired set of parameter values for the input image of FIG. 13A.

Figure 13C:
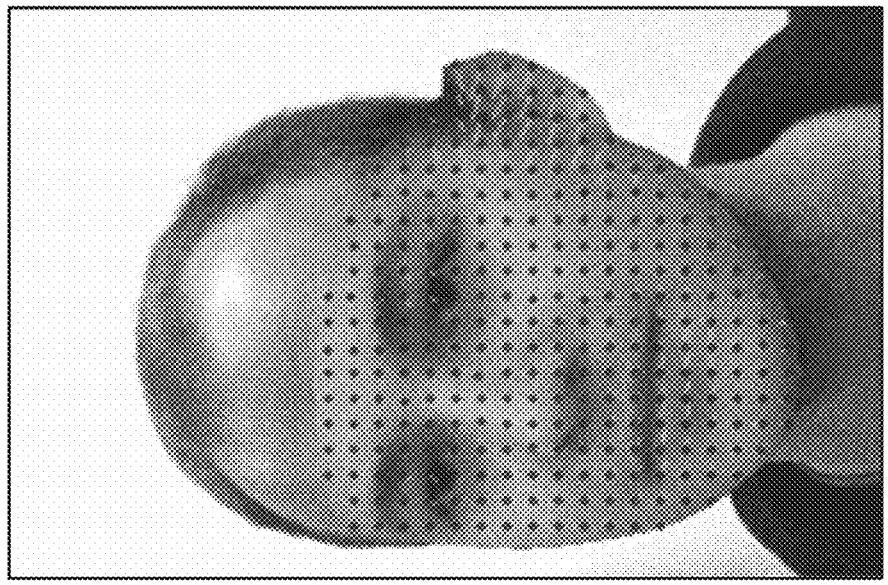
Figure 13B:
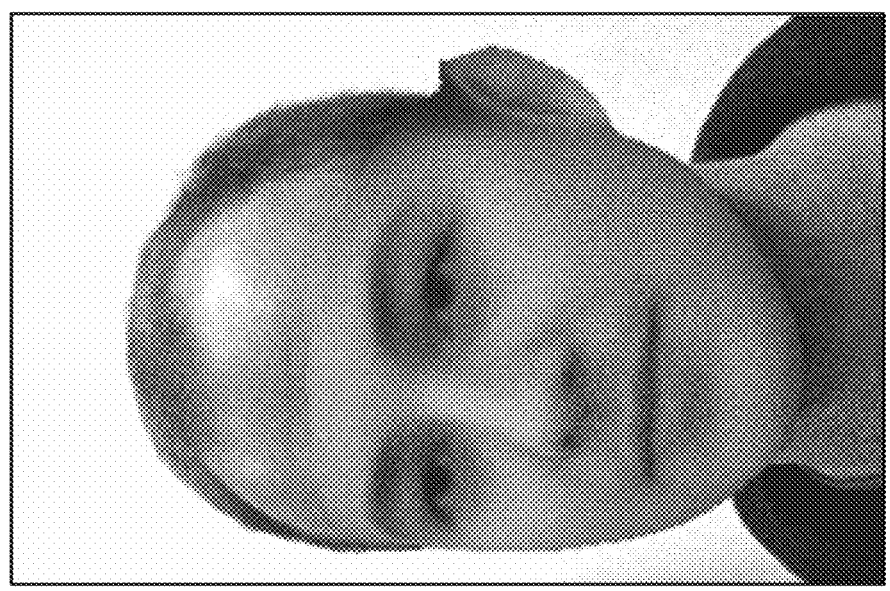

FIG. 13B shows a first candidate synthetic image that is generated from an average face. In some embodiments, the average head comprises the average shape combined with the average texture of various input 3D faces of actual users. In the example of FIG. 13B, a 2D image of the average face is overlaid on the input image of FIG. 13A to generate the first candidate synthetic image. In some embodiments, the average face comprises a starting point in the search for a desired set of parameter values for any input image of a user's face. Put another way, in some embodiments, in the first iteration of searching for parameter values using formulae such as formulae (1) and (2), the shape ($\alpha_i$) and texture ($\beta_i$) coefficients are set to zero. As such, the (a combination of $S_{avg}$ and $T_{avg}$) average face becomes a starting point in the search for the desired set of parameter values for any input image of a user's face.

FIG. 13C shows the results of optical flow from the first candidate synthetic image of FIG. 13B to the input image of FIG. 13A. Each dot on the face shown in the first candidate synthetic image represents every ninth pixel of the face and the line extending from the dot, if any, represents the displacement of that pixel from its original location in the first candidate synthetic image of FIG. 13B to its new location in the input image of FIG. 13A. (The displacement of only every ninth pixel is shown in FIG. 13C for illustrative purposes.) The results of optical flow as visually shown in FIG. 13C from the first candidate synthetic image of FIG. 13B to the input image of FIG. 13A are used by a process such as process 1100 of FIG. 11 to determine one or more optical flow related costs (e.g., optical flow landmarks cost and optical flow color cost) for the first candidate synthetic image of FIG. 13B. The one or more optical flow related costs are then used to determine a first new candidate set of parameter values for modeling a 3D model of a face to correspond to the input face of FIG. 13A.

Figure 13E:
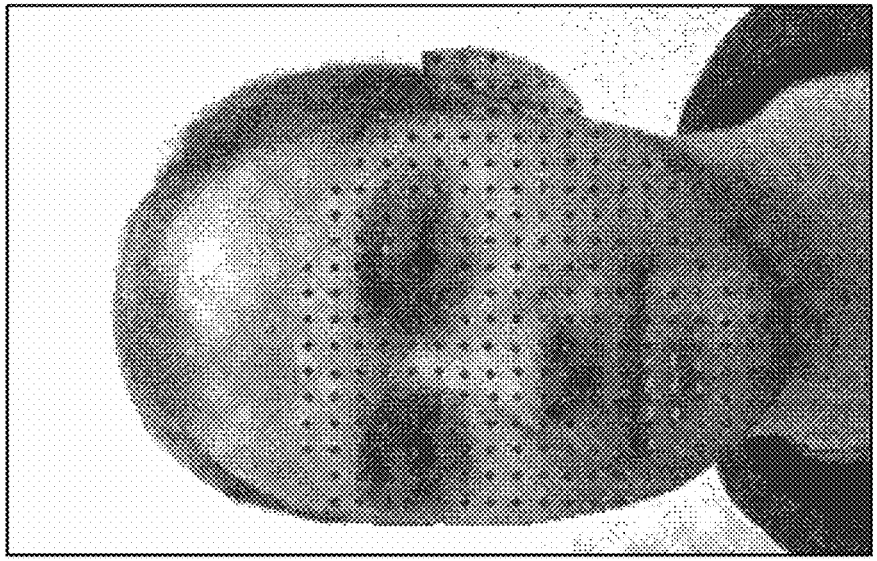
Figure 13D:
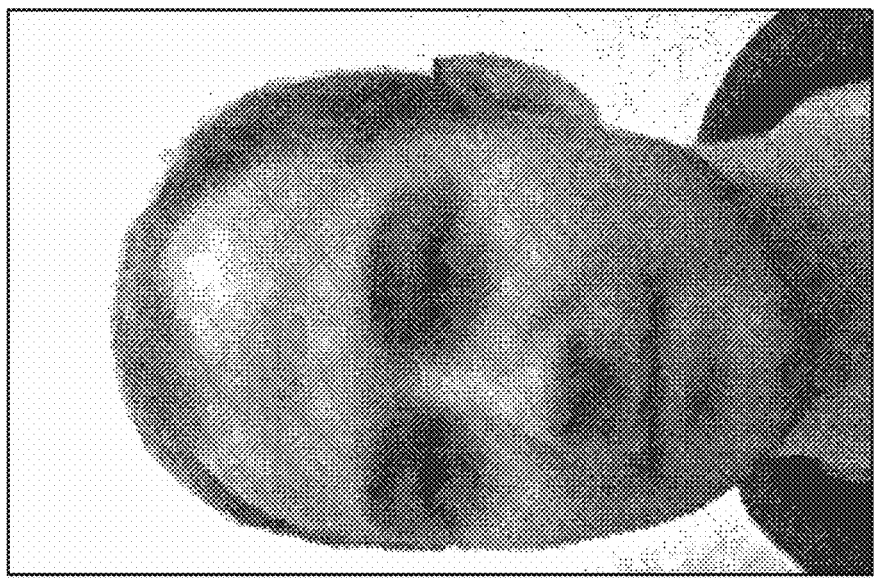

FIG. 13D shows a second candidate synthetic image that is generated based on the first new candidate set of parameter values determined based on the optical flow results of FIG. 13C.

FIG. 13E shows the results of optical flow from the second candidate synthetic image of FIG. 13D to the input image of FIG. 13A. The one or more optical flow related costs determined based on the optical flow results of FIG. 13E are then used to determine a second new candidate set of parameter values for modeling a 3D model of a face corresponding to the input face of FIG. 13A.

Figure 13G:
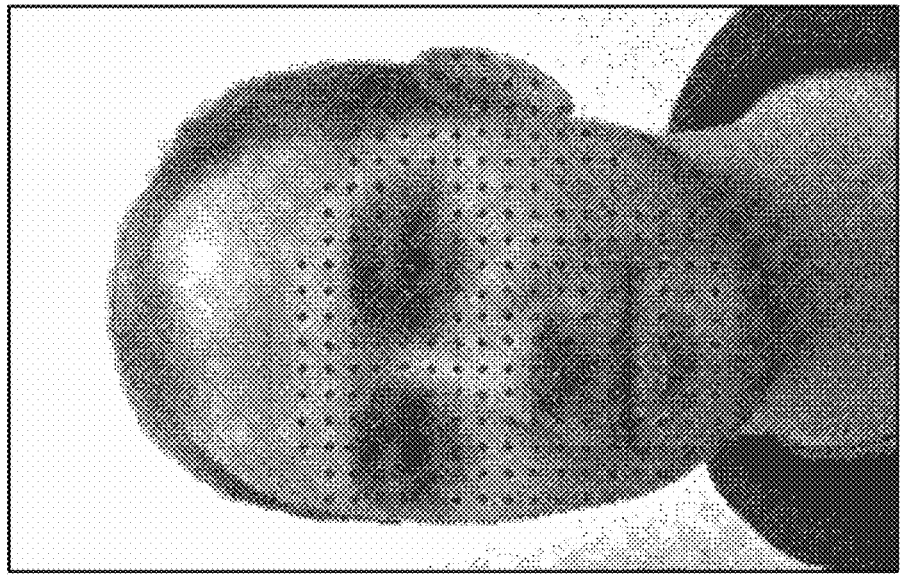
Figure 13F:
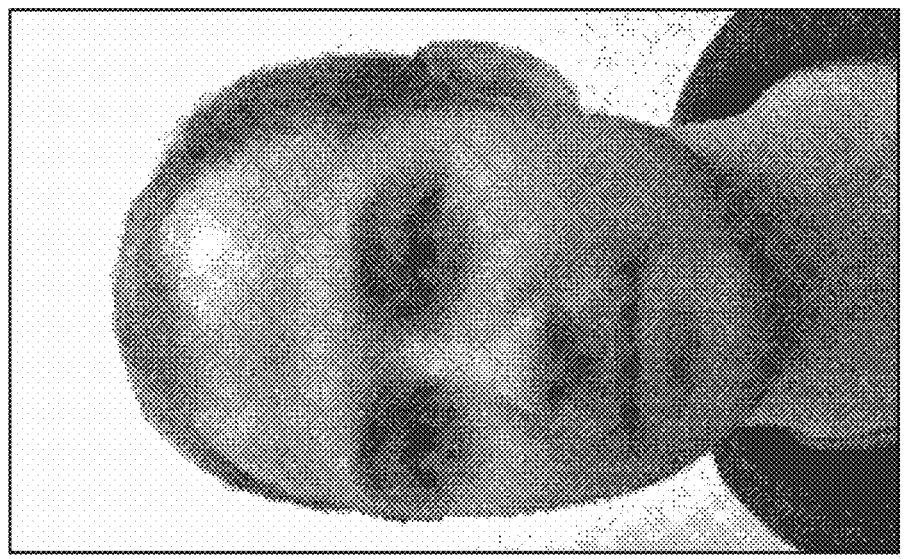

FIG. 13F shows a third candidate synthetic image that is generated based on the second new candidate set of parameter values determined based on the optical flow results of FIG. 13E.

FIG. 13G shows the results of optical flow from the third candidate synthetic image of FIG. 13F to the input image of FIG. 13A. The one or more optical flow related costs determined based on the optical flow results of FIG. 13G are then used to determine a third new candidate set of parameter values for modeling a 3D model of a face corresponding to the input face of FIG. 13A.

FIG. 13H shows a fourth candidate synthetic image that is generated based on the third new candidate set of parameter values determined based on the optical flow results of FIG. 13G.

FIG. 13I shows the results of optical flow from the fourth candidate synthetic image of FIG. 13H to the input image of FIG. 13A. In the example of FIG. 13I, the one or more optical flow related costs determined based on the optical flow results of FIG. 13I are used to determine that no further candidate sets of parameter values need to be searched because, based on a set of criteria, the third new candidate set of parameter values for modeling a 3D model of a face is the desired set of parameter values for modeling a 3D model of a face corresponding to the input face of FIG. 13A.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor is configured to:
  receive a two-dimensional (2D) input image of a user's face to be modeled; and
  generate a desired set of parameter values for a statistical model and a camera that correspond to the 2D input image by evaluating candidate parameter values using a cost function that is determined based at least in part on optical flow, wherein to generate the desired set of parameter values includes to:
    determine a first candidate set of parameter values;
    generate a three-dimensional (3D) model of a face using a first subset of parameter values associated with the statistical model from the first candidate set of parameter values;
    generate a first 2D candidate synthetic image using the 3D model of the face and a second subset of parameter values associated with the camera from the first candidate set of parameter values;
    determine an aggregated cost between the first 2D candidate synthetic image and the 2D input image based at least in part on one or more optical flow related cost functions determined based on optical flow results from the first 2D candidate synthetic image to the 2D input image;
    use the aggregated cost to determine whether the first candidate set of parameter values is the desired set of parameter values; and
    in response to the determination that the first candidate set of parameter values is not the desired set of parameter values, use the aggregated cost to determine a second candidate set of parameter values; and
a memory coupled to the processor and configured to provide the processor with instructions.

2. The system of claim 1, wherein the statistical model comprises a Principal Component Analysis model comprising a set of shape components and a set of texture components.

3. The system of claim 2, wherein the desired set of parameter values comprises a desired subset of shape coefficients corresponding to respective ones of the set of shape components and a set of texture coefficients corresponding to respective ones of the set of texture components.

4. The system of claim 1, wherein one or more parameter values included in the desired set of parameter values associated with the camera describes one or more of the following: a focal length associated with the camera, a rotation associated with the camera, and a translation associated with the camera.

5. The system of claim 1, wherein the optical flow results from the first 2D candidate synthetic image to the 2D input image include a corresponding displacement that indicates a new location in the 2D input image that each pixel that is visible in the first 2D candidate synthetic image has moved.

6. The system of claim 1, wherein the processor is further configured to determine the one or more optical flow related cost functions determined based on the optical flow results from the first 2D candidate synthetic image to the 2D input image, including to:
for a synthetic pixel of the first 2D candidate synthetic image, use the optical flow results to determine a corresponding pixel in the 2D input image;
determine a target landmark associated with the corresponding pixel in the 2D input image;
determine an optical flow landmarks cost based at least in part on a difference between a synthetic landmark of the synthetic pixel in the first 2D candidate synthetic image and the target landmark of the corresponding pixel in the 2D input image;
determine a target color associated with the corresponding pixel in the 2D input image;
determine an optical flow color cost associated with the synthetic pixel based at least in part on a difference between a synthetic color of the synthetic pixel in the first 2D candidate synthetic image and the target color of the corresponding pixel in the 2D input image; and
determine an optical flow cost associated with the first 2D candidate synthetic image based at least in part on optical flow landmarks costs and optical flow color costs associated with synthetic pixels of the first 2D candidate synthetic image.

7. The system of claim 6, wherein to determine the aggregated cost between the first 2D candidate synthetic image and the 2D input image comprises to combine the optical flow cost associated with the first 2D candidate synthetic image with a Gaussian prior cost associated with the first 2D candidate synthetic image.

8. The system of claim 1, wherein the processor is configured to:
input a plurality of 3D scans of users' faces into a Principal Component Analysis; and
receive from the Principal Component Analysis the statistical model comprising a set of shape components and a set of texture components.

9. A method, comprising:
receiving a two-dimensional (2D) input image of a user's face to be modeled; and
generating a desired set of parameter values for a statistical model and a camera that correspond to the 2D input image by evaluating candidate parameter values using a cost function that is determined based at least in part on optical flow, wherein generating the desired set of parameter values includes:
determining a first candidate set of parameter values;
generating a three-dimensional (3D) model of a face using a first subset of parameter values associated with the statistical model from the first candidate set of parameter values;
generating a first 2D candidate synthetic image using the 3D model of the face and a second subset of parameter values associated with the camera from the first candidate set of parameter values;
determining an aggregated cost between the first 2D candidate synthetic image and the 2D input image based at least in part on one or more optical flow related cost functions determined based on optical flow results from the first 2D candidate synthetic image to the 2D input image;
using the aggregated cost to determine whether the first candidate set of parameter values is the desired set of parameter values; and
in response to the determination that the first candidate set of parameter values is not the desired set of parameter values, using the aggregated cost to determine a second candidate set of parameter values.

10. The method of claim 9, wherein the statistical model comprises a Principal Component Analysis model comprising a set of shape components and a set of texture components.

11. The method of claim 10, wherein the desired set of parameter values comprises a desired subset of shape coefficients corresponding to respective ones of the set of shape components and a set of texture coefficients corresponding to respective ones of the set of texture components.

12. The method of claim 9, wherein one or more parameter values included in the desired set of parameter values associated with the camera describes one or more of the following: a focal length associated with the camera, a rotation associated with the camera, and a translation associated with the camera.

13. The method of claim 9, wherein the optical flow results from the first 2D candidate synthetic image to the 2D input image include a corresponding displacement that indicates a new location in the 2D input image that each pixel that is visible in the first 2D candidate synthetic image has moved.

14. The method of claim 9, further determining the one or more optical flow related cost functions determined based on the optical flow results from the first 2D candidate synthetic image to the 2D input image, including:
for a synthetic pixel of the first 2D candidate synthetic image, using the optical flow results to determine a corresponding pixel in the 2D input image;
determining a target landmark associated with the corresponding pixel in the 2D input image;
determining an optical flow landmarks cost based at least in part on a difference between a synthetic landmark of the synthetic pixel in the first 2D candidate synthetic image and the target landmark of the corresponding pixel in the 2D input image;
determining a target color associated with the corresponding pixel in the 2D input image;
determining an optical flow color cost associated with the synthetic pixel based at least in part on a difference between a synthetic color of the synthetic pixel in the first 2D candidate synthetic image and the target color of the corresponding pixel in the 2D input image; and determining an optical flow cost associated with the first 2D candidate synthetic image based at least in part on optical flow landmarks costs and optical flow color costs associated with synthetic pixels of the first 2D candidate synthetic image.

15. The method of claim 14, wherein determining the aggregated cost between the first 2D candidate synthetic image and the 2D input image comprises combining the optical flow cost associated with the first 2D candidate synthetic image with a Gaussian prior cost associated with the first 2D candidate synthetic image.

16. A computer program product, the computer program product being embodied in a non-transitory computer readable storage medium and comprising computer instructions for:

receiving a two-dimensional (2D) input image of a user's face to be modeled; and generating a desired set of parameter values for a statistical model and a camera that correspond to 2D the input image by evaluating candidate parameter values using a cost function that is determined based at least in part on optical flow, wherein generating the desired set of parameter values includes:

determining a first candidate set of parameter values;

generating a three-dimensional (3D) model of a face using a first subset of parameter values associated with the statistical model from the first candidate set of parameter values;

generating a first 2D candidate synthetic image using the 3D model of the face and a second subset of parameter values associated with the camera from the first candidate set of parameter values;

determining an aggregated cost between the first 2D candidate synthetic image and the 2D input image based at least in part on one or more optical flow related cost functions determined based on optical flow results from the first 2D candidate synthetic image to the 2D input image;

using the aggregated cost to determine whether the first candidate set of parameter values is the desired set of parameter values; and in response to the determination that the first candidate set of parameter values is not the desired set of parameter values, using the aggregated cost to determine a second candidate set of parameter values.

* * * * *

UNITED STATES PATENT AND TRADEMARK OFFICE
CERTIFICATE OF CORRECTION

PATENT NO. : 10,229,534 B2  
APPLICATION NO. : 15/441760  
DATED : March 12, 2019  
INVENTOR(S) : Michael Wang Page 1 of 1

It is certified that error appears in the above-identified patent and that said Letters Patent is hereby corrected as shown below:

In the Specification

In Column 1, Line 56, delete "13B" and insert --13I--, therefor.

In Column 4, Line 52, delete "mutliple" and insert --multiple--, therefor.

In Column 11, Line 45, delete "emboidments" and insert --embodiments--, therefor.

In Column 15, Line 7, delete "C0F Landmark" and insert --C0F_Landmark--, therefor.

In the Claims

In Column 19, Claim 16, Line 19, after "correspond to", delete "2D the" and insert --the 2D--, therefor.

Signed and Sealed this  
Third Day of September, 2019

Andrei Iancu  
*Director of the United States Patent and Trademark Office*